US008930293B2

(12) United States Patent
Nonoyama et al.

(10) Patent No.: US 8,930,293 B2
(45) Date of Patent: Jan. 6, 2015

(54) PREDICTION APPARATUS, PREDICTION METHOD, AND RECORDING MEDIUM

(75) Inventors: Kei Nonoyama, Saitama (JP); Kenya Sogo, Tokyo (JP); Kyohei Kokeguchi, Tokyo (JP)

(73) Assignee: The Bank of Tokyo-Mitsubishi UFJ, Ltd., Chiyoda-ku, Tokyo (JP)

(*) Notice: Subject to any disclaimer, the term of this patent is extended or adjusted under 35 U.S.C. 154(b) by 510 days.

(21) Appl. No.: 13/280,528

(22) Filed: Oct. 25, 2011

(65) Prior Publication Data

US 2012/0101802 A1  Apr. 26, 2012

(30) Foreign Application Priority Data

Oct. 25, 2010  (JP) .................................. 2010-238640
Feb. 4, 2011  (JP) .................................. 2011-023109
Sep. 7, 2011  (JP) .................................. 2011-195400

(51) Int. Cl.
*G06F 11/34*  (2006.01)

(52) U.S. Cl.
CPC ........ *G06F 11/3419* (2013.01); *G06F 2201/87* (2013.01); *G06F 11/3476* (2013.01); *G06F 11/3452* (2013.01); *G06F 2201/865* (2013.01); *G06F 11/3466* (2013.01); *G06F 2201/80* (2013.01)
USPC .......................................................... 706/45

(58) Field of Classification Search
CPC ..... G06N 5/02; G06N 99/005; G06F 11/3447
See application file for complete search history.

(56) References Cited

U.S. PATENT DOCUMENTS

2006/0074970 A1*  4/2006  Narayanan et al. ........... 707/102
2010/0082507 A1*  4/2010  Ganapathi et al. .............. 706/12
2010/0235349 A1*  9/2010  Kuno et al. .................... 707/718

FOREIGN PATENT DOCUMENTS

| JP | 06-324919 | 11/1994 |
| JP | 08-083284 | 3/1996 |
| JP | 2001-125784 A | 5/2001 |
| JP | 2002-183416 A | 6/2002 |
| JP | 2002-268922 A | 9/2002 |
| JP | 2004-021756 | 1/2004 |
| JP | 2007-002673 | 1/2007 |
| JP | 2007-241667 A | 9/2007 |
| JP | 2008-040980 | 2/2008 |
| JP | 2008-129876 | 6/2008 |
| JP | 2009-271776 | 11/2009 |

OTHER PUBLICATIONS

Notice of Reasons for Rejection issued in corresponding Japanese Patent Application No. 2011-195400, mailed Feb. 26, 2013.

(Continued)

*Primary Examiner* — Jeffrey A Gaffin
*Assistant Examiner* — Mikayla Chubb
(74) *Attorney, Agent, or Firm* — Banner & Witcoff, Ltd.

(57) ABSTRACT

Response performance of a new type of transaction processing based on a new program, when the new type of transaction processing is executed by a computer of an information processing system, is predicted. The information processing system executes transaction processing requiring access to a database system in response to an external processing request. Upon prediction of response performance each value of a plurality of parameters related to operation that affects response speed of a database system assumed in the new type of transaction processing is acquired. The acquired each value of the plurality of parameters is inputted to a predetermined evaluation formula to calculate an evaluation value related to response performance of the new type of transaction processing.

26 Claims, 13 Drawing Sheets

(56) References Cited

OTHER PUBLICATIONS

Masaya Shibaki, "Consideration on a derivation method of an efficient work process in light of workability in the construction work inside a building equipped with communication facilities", Technical Report by The Institute of Electronics, Information and Communication Engineers, Jul. 2, 2004, vol. 104, No. 165, pp. 1-6. —>> See JP office action of Feb. 26, 2013 for statement of relevancy.

Report on Prior Art Search dated Jul. 1, 2010.

* cited by examiner

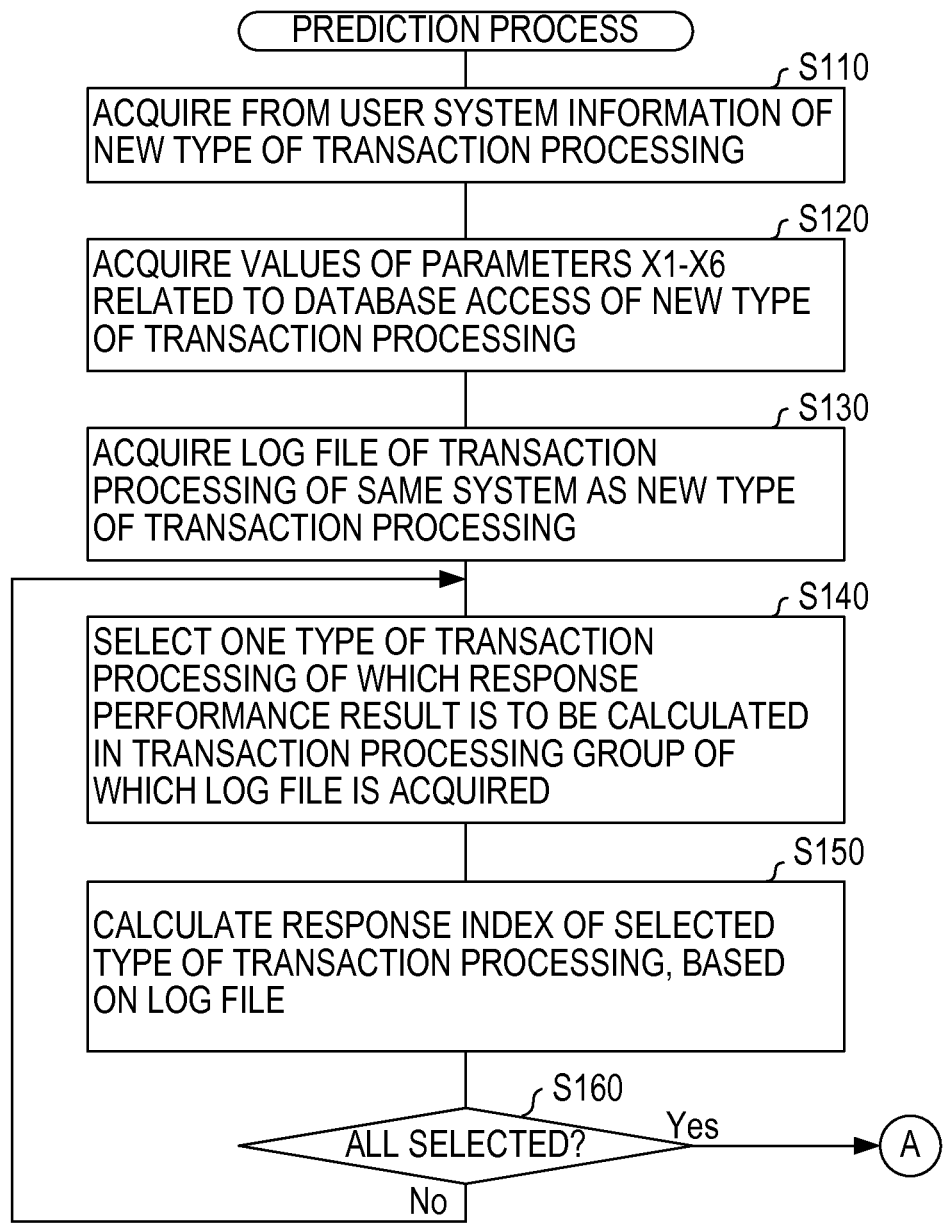

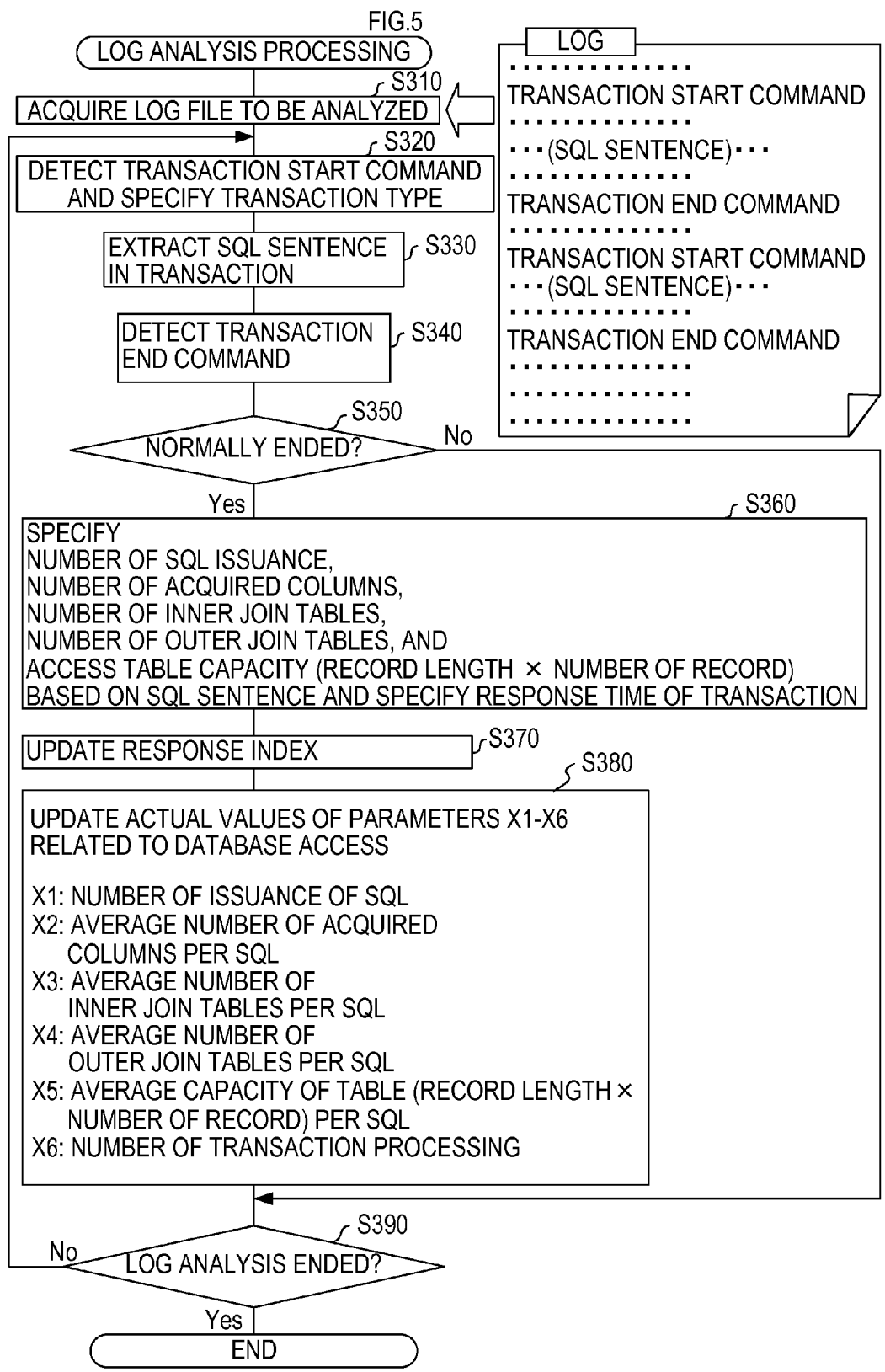

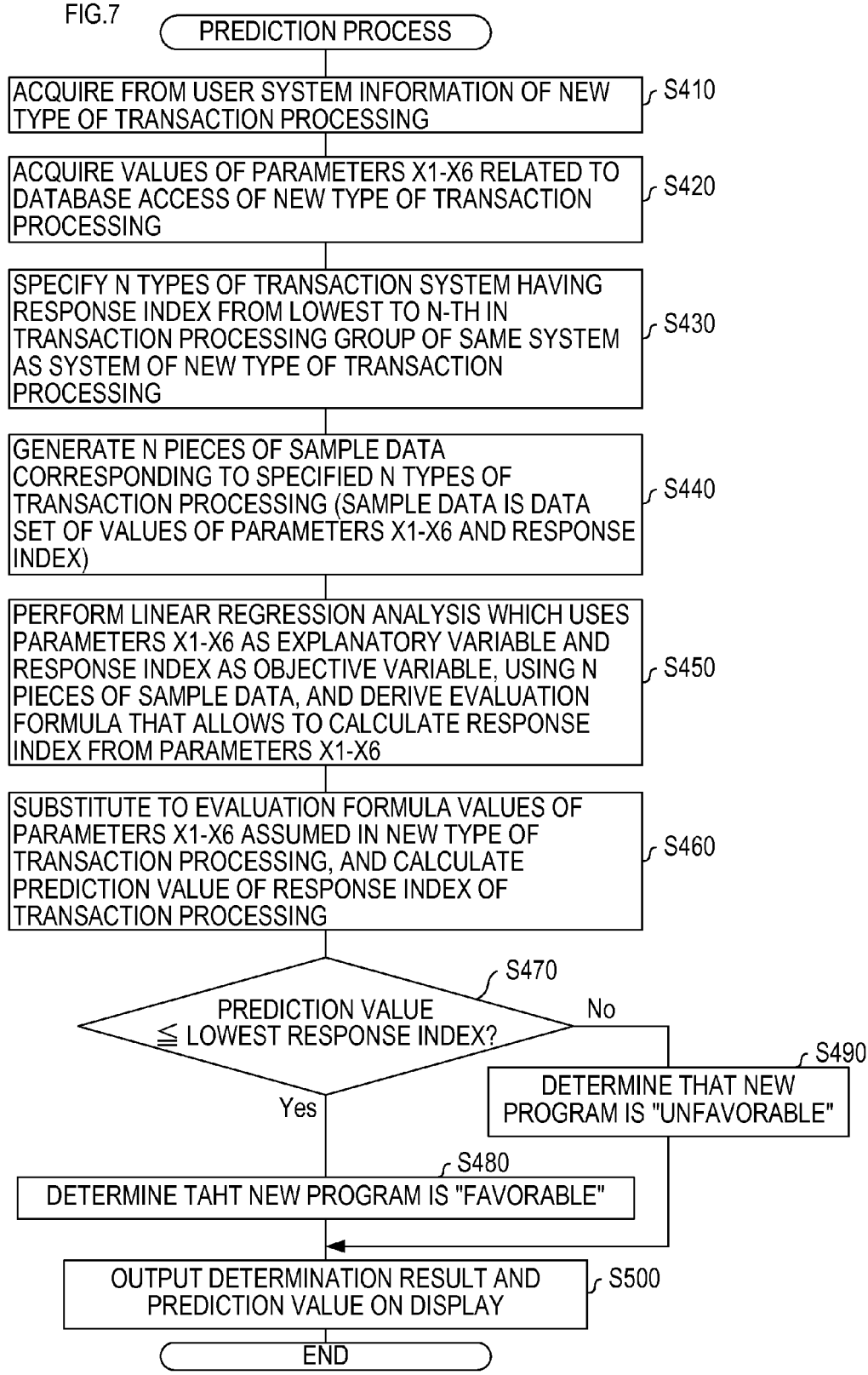

FIG.8

| IDENTIFICATION | AVERAGE RESPONSE TIME | RI | Z1 | Z2 | Z3 | Z4 | Z5 |
|---|---|---|---|---|---|---|---|
| TRX0001 | 2.51 | 7334.00 | 37 | 6.70 | 378 | 5.65 | 2918 |
| TRX0002 | 3.86 | 2168.96 | 21 | 3.82 | 66 | 28.68 | 562 |
| TRX0003 | 6.39 | 716.23 | 1 | 27.00 | 20 | 15.80 | 112 |
| TRX0004 | 0.39 | 679.34 | 10 | 1.50 | 42 | 6.62 | 1741 |
| TRX0005 | 5.59 | 570.34 | 41 | 4.41 | 746 | 1.67 | 102 |
| TRX0006 | 0.63 | 559.66 | 4 | 1.67 | 9 | 0.07 | 895 |
| TRX0007 | 0.36 | 449.08 | 12 | 32.03 | 63 | 2.46 | 1246 |
| TRX0008 | 0.34 | 292.39 | 2 | 1.00 | 3 | 0.00 | 857 |
| TRX0009 | 1.34 | 173.76 | 2 | 2.00 | 2 | 0.03 | 130 |
| TRX0010 | 1.34 | 173.76 | 2 | 2.00 | 2 | 0.03 | 130 |
| TRX0011 | 3.59 | 172.26 | 10 | 1.07 | 359 | 12.95 | 48 |
| TRX0012 | 0.56 | 146.33 | 13 | 1.71 | 34 | 0.98 | 260 |
| TRX0013 | 0.21 | 128.95 | 1 | 103.00 | 1 | 0.07 | 605 |
| TRX0014 | 0.21 | 128.95 | 10 | 5.20 | 10 | 0.10 | 605 |
| TRX0015 | 8.25 | 107.30 | 5 | 8.60 | 14 | 5.60 | 13 |
| TRX0016 | 3.30 | 92.36 | 19 | 4.42 | 79 | 1.23 | 28 |
| TRX0017 | 0.06 | 73.64 | 1 | 1.00 | 1 | 0.00 | 1284 |
| ... | ... | ... | ... | ... | ... | ... | ... |
| TRX0098 | 0.02 | 0.02 | 2 | 2.00 | 4 | 0.10 | 1 |
| TRX0099 | 0.02 | 0.02 | 3 | 1.67 | 3 | 0.07 | 1 |
| TRX0100 | 0.02 | 0.02 | 3 | 1.67 | 6 | 0.07 | 1 |
| TRX0101 | 0.01 | 0.02 | 2 | 2.00 | 2 | 0.10 | 2 |
| TRX0102 | 0.00 | 0.02 | 1 | 103.00 | 1 | 0.07 | 65 |
| TRX0103 | 0.01 | 0.01 | 1 | 3.00 | 1 | 0.07 | 2 |
| TRX0104 | 0.01 | 0.01 | 2 | 2.00 | 2 | 0.06 | 1 |
| TRX0105 | 0.01 | 0.01 | 1 | 3.00 | 1 | 0.12 | 1 |
| TRX0106 | 0.01 | 0.01 | 2 | 2.00 | 2 | 0.10 | 1 |
| TRX0107 | 0.01 | 0.01 | 3 | 4.00 | 4 | 15.58 | 1 |
| TRX0108 | 0.01 | 0.01 | 1 | 3.00 | 1 | 0.12 | 1 |

FIG.11

[INITIAL TIME]
RI = − 234.52 + 38.97 × Z1 − 2.56 × Z2 + 0.54 × Z3 + 8.53 × Z4 + 0.65 × Z5

| | | | | | |
|---|---|---|---|---|---|
| t VALUE | 3.19 | −0.75 | 0.55 | 1.34 | 6.19 |
| p VALUE | 0.001 | 0.45 | 0.58 | 0.17 | 0.001 |

REMOVE PARAMETERS Z2 AND Z3

[SECOND TIME]
RI = − 262.94 + 44.44 × Z1 + 8.71 × Z4 + 0.64 × Z5

| | | | |
|---|---|---|---|
| t VALUE | 5.89 | 1.42 | 6.18 |
| p VALUE | 0.001 | 0.16 | 0.001 |

REMOVE PARAMETER Z4

[THIRD TIME]
RI = − 234.54 + 44.92 × Z1 + 0.63 × Z5

| | | |
|---|---|---|
| t VALUE | 5.92 | 6.12 |
| p VALUE | 0.001 | 0.001 |

PREDICTION APPARATUS, PREDICTION METHOD, AND RECORDING MEDIUM

CROSS-REFERENCE TO RELATED APPLICATIONS

This application claims the benefit of Japanese Patent Application No. 2010-238640 filed on Oct. 25, 2010, No. 2011-023109 filed on Feb. 4, 2011, and No. 2011-195400 filed on Sep. 7, 2011 in the Japan Patent Office, the disclosures of which are incorporated herein by reference.

BACKGROUND

The present invention relates to an apparatus and a method for predicting response performance of transaction processing, and a recording medium recording a program for making a computer implement the function of the apparatus.

Conventionally known is a performance prediction system which predicts performance of a computer system. For example, Japanese Patent Application Publication No. 2008-129876 discloses a system which predicts performance of a computer system based on the operation result of the computer system. The computer system includes front end servers, middle servers and backend servers. Each of the front end servers provides a user interface. Each of the middle servers executes predetermined processes via backend servers in response to requests from the front end servers, and returns the processing results to request sources. Each of the backend servers manages a database, and reads/writes data from/to the database in response to requests from the middle servers.

The performance prediction system stores, as the operation result of the middle servers, information of a number of servers, an average CPU utilization ratio, a BL performance function, an execution time per application, etc. The BL performance function calculates the CPU utilization ratio of middle servers from start frequencies of applications in the middle servers. The performance prediction system also stores a DB performance function. The DB performance function calculates, as the operation result of backend servers, a CPU utilization ratio of the backend servers from the total execution time of applications in the middle servers. In the event of addition of work-related matters, a required number of servers is calculated based on these operation results.

Particularly, on the basis of the start frequencies of applications corresponding to the added work-related matters, an increase in the CPU utilization ratio in the middle servers is calculated using the BL performance function. Based on the increase and the average CPU utilization ratio of the middle servers, a CPU utilization ratio after the addition of the work-related matters is predicted. Based on the predicted CPU utilization ratio, the required number of middle servers is calculated. As for the backend server, increases in the execution time of applications corresponding to the added work-related matters are calculated. On the basis of the increases, the execution time per application stored as the operation result of the middle servers, and so on, the total execution time of the applications after the addition of the work-related matters is calculated. On the basis of the total execution time and the DB performance function, the CPU utilization ratio in the backend servers is calculated, so that the required number of backend servers is calculated.

SUMMARY

The inventors of the present invention have desire to estimate how much response performance they get from transaction processing by a new program, when installing the new program on an information processing system currently used for business, without conducting a performance test by execution of the new program on the information processing system. The new program includes a corrected program of a program already installed on the information processing system.

If response performance can be estimated at a design stage of a program without a performance test, it is easy to cope with a possible problem in the response performance of the program, as compared to a case where the response performance can be only grasped in a performance test after programming. Also, if a new program having a problem is installed on the information processing system, transaction processing by an existing program is adversely affected. Thus, upon enforcing the aforementioned performance test in a state where the response performance cannot be grasped, a careful procedure, such as temporary prohibition of ordinary use of the information processing system, is required. This is the reason why the inventors desire to estimate response performance without a performance test.

However, response performance of transaction processing requiring access to a database system is largely affected by response performance of the database system. Therefore, it is not easy to estimate beforehand the response performance of this type of transaction processing by a new program.

As mentioned above, a technique of evaluating system performance based on the operation result is conventionally known. However, this technique merely allows to predict load of the system and to adjust the number of servers, under the condition that the start frequencies of applications and increases in the execution time of applications by addition of work-related matters can be estimated.

As far as the present inventors know, the existing techniques do not allow to estimate response performance of processing by a new program that makes a computer execute transaction processing requiring access to a database system, without a performance test by execution of the program.

It is preferable that one aspect of the present invention may provide a technique that allows to pre-estimate response performance of transaction processing by a program that makes a computer execute the transaction processing. The transaction processing requires access to a database system.

A prediction apparatus in the first aspect of the present invention predicts response performance of a new type of transaction processing, when a new program is installed on an information processing system and a computer of the information processing system executes the new type of transaction processing based on the new program. The information processing system executes transaction processing requiring access to a database system in response to an external processing request. The prediction apparatus at least includes a new program information acquisition unit, and a prediction unit. The prediction apparatus can further include a history acquisition unit, a first deriving unit, a second deriving unit, and an evaluation formula deriving unit. The "new program" herein also includes a corrected program of a program already installed on the information processing system.

The history acquisition unit acquires execution history of transaction processing by an existing program installed on the information processing system. The first deriving unit, based on the execution history, derives an actual value related to response performance per transaction processing executed by the existing program.

The second deriving unit derives, based on the execution history, each actual value of a plurality of parameters related to operation that affects response speed of the database system in the transaction processing, per transaction processing. The plurality of parameters herein include, for example, parameters related to action (access) to the database system by the transaction processing.

The evaluation formula deriving unit, based on the actual value related to the response performance per transaction processing and the each actual value of the plurality of parameters per transaction processing, derives a evaluation formula that allows to calculate an evaluation value related to response performance of transaction processing to be executed in the information processing system. Particularly, the evaluation formula deriving unit may derive, as the evaluation formula, an evaluation formula which includes at least part of the plurality of parameters as an input variable and the evaluation value related to response performance of transaction processing as an output variable.

Further particularly, the evaluation formula deriving unit may be configured to derive the evaluation formula by performing a regression analysis. The regression analysis is performed by using as samples the actual value related to response performance per transaction processing derived by the first deriving unit and the each actual value of the plurality of parameters per transaction processing derived by the second deriving unit.

The new program information acquisition unit acquires a value of each the parameter corresponding to the input variable of the evaluation formula. The acquired value is a value assumed in the new type of transaction processing based on the new program when the new type of transaction processing is executed by a computer of the information processing system. The prediction unit inputs the value of each the parameter acquired by the new program information acquisition unit to the evaluation formula, and calculates an evaluation value related to response performance of the new type of transaction processing. Thereby, response performance of the new type of transaction processing is predicted.

In the prediction apparatus configured as above, it is presupposed that transaction processing which uses the same database system as the database system used by the new program is executed on the information processing system. Information on response performance of the database system is indirectly acquired in the form of each actual value of the plurality of parameters in an existing type of transaction processing and of an actual value of response performance of the existing type of transaction processing. Based on the information, response performance of transaction processing to be implemented by the new program is evaluated.

According to the present invention, without installing a new program on the information processing system to make the computer execute transaction processing by the new program, response performance of the transaction processing by the new program can be evaluated in consideration of response performance of the database system. According to the present invention, as compared to prior art where response performance of the transaction processing by a new program can be evaluated only in a performance test after programming, it is easy to cope with a possible problem in response performance. A tool can be offered which is useful to a system manager.

For example, according to the present invention, response performance can be grasped at a design stage of a new program prior to completion of programming. Thus, in the event of problem in the response performance, details of the new program can be changed. Also, transaction processing by an existing program can be kept free of adverse effect due to installation of a new program having a problem in response performance on the information processing system. Accordingly, procedures requested upon executing a performance test by a new program of which response performance is unknown can be relaxed/omitted. Specifically, according to the present invention, convenience related to testing response performance of transaction processing by a new program can be largely improved as compared to before.

Presupposing that a prediction apparatus is used upon installation of a new program on a system where a plurality of types of transaction processing are already executed by an existing program, it is preferable that the prediction apparatus is configured to derive the each actual value per type of transaction processing.

Specifically, it is preferable that the history acquisition unit acquires execution history of a plurality of types of transaction processing executed by an existing program already installed on the information processing system, the first deriving unit, based on the execution history acquired by the history acquisition unit, derives an actual value related to response performance of the type of transaction processing executed by the existing program, per type of transaction processing, and the second deriving unit, based on the execution history acquired by the history acquisition unit, derives each actual value of a plurality of parameters related to operation that affects response speed of the database system in the type of transaction processing executed by the existing program, per type of transaction processing.

It is preferable that the evaluation formula deriving unit is configured to derive the evaluation formula that allows to calculate an evaluation value related to response performance of transaction processing to be executed in the information processing system, based on the actual value related to the response performance per type of transaction processing derived by the first deriving unit and the each actual value of the plurality of parameters per type of transaction processing derived by the second deriving unit.

With the prediction apparatus configured as above, influence due to fluctuation in actual response performance in each round of transaction processing can be suppressed. Response performance of transaction processing by a new program can be evaluated with a properly derived evaluation formula.

Particularly, the evaluation formula deriving unit can be configured to derive, as the evaluation formula, an evaluation formula which includes at least part of the plurality of parameters as an input variable and an evaluation value related to response performance of transaction processing as an output variable. Further particularly, the evaluation formula deriving unit can be configured to derive the evaluation formula by performing a regression analysis. The regression analysis is performed by using as samples the actual value related to the response performance per type of transaction processing derived by the first deriving unit and the each actual value of the plurality of parameters per type of transaction processing derived by the second deriving unit.

Upon deriving the evaluation formula by execution of a regression analysis, the evaluation formula deriving unit may be configured to perform a regression analysis which uses the plurality of parameters as an explanatory variable and the evaluation value related to response performance of the transaction processing as an objective variable, thereby deriving an evaluation formula which includes the plurality of parameters as an input variable and the evaluation value related to response performance of the transaction processing as an output variable.

Or, the evaluation formula deriving unit may be configured to perform a regression analysis which uses part of the plurality of parameters as an explanatory variable and the evaluation value related to response performance of the transaction processing as an objective variable, thereby deriving an evaluation formula which includes part of the plurality of parameters as an input variable and the evaluation value related to response performance of the transaction processing as an output variable.

If the evaluation formula deriving unit is configured to derive the evaluation formula which includes part of the above plurality of parameters as an input variable and the evaluation value related to response performance of the transaction processing as an output variable, a restriction unit may be provided in the evaluation formula deriving unit. The restriction unit restricts the explanatory variable in the regression analysis executed upon deriving the evaluation formula to part of the plurality of parameters.

Particularly, the restriction unit can be configured to execute a regression analysis which uses the plurality of parameters as the explanatory variable and the evaluation value related to response performance of the transaction processing as the objective variable, and, based on at least one of a t value and a p value of the explanatory variable acquired by the regression analysis, restrict the explanatory variable in the regression analysis executed upon deriving the evaluation formula to part of the plurality of parameters.

The evaluation formula deriving unit can be configured to derive an evaluation formula which uses part of the plurality of parameters as the input variable and the evaluation value related to response performance of the transaction processing as the output variable, by performing a regression analysis which uses part of the plurality of parameters restricted by the restriction unit as the explanatory variable and the evaluation value related to response performance of the transaction processing as the output variable.

The t value and p value acquired in the regression analysis evaluate null hypothesis where an assumed coefficient (slope) is zero. As is known, the t value indicates a degree of relativity to the objective variable. The p value indicates a hazard ratio of the slope of the explanatory variable. The parameter having a low t value is highly probably improper as the explanatory variable. The parameter having a high p value is highly probably improper as the explanatory variable.

Accordingly, if the explanatory variable in the regression analysis executed upon deriving the evaluation formula is restricted to part of the plurality of parameters, based on at least one of the t value and p value, improper parameters for the explanatory variable can be removed. An adequate evaluation formula can be derived.

The above-described restriction unit does not necessarily operate each time the evaluation formula is derived. The restriction unit may operate per a plurality of times of derivations of the evaluation formula, or may operate asynchronously with derivation of the evaluation formula. The restriction unit may be configured not to operate once after restricting the explanatory variable to part of the plurality of parameters.

Also, the restriction unit may be configured to gradually restrict the explanatory variable in a regression analysis executed upon deriving the evaluation formula to part of the plurality of parameters, by executing the regression analysis a plurality of times.

Particularly, the restriction unit can be configured as follows. In an initial regression analysis, the plurality of parameters are used as the explanatory variable to execute a regression analysis. Based on at least one of a t value and a p value of the explanatory variable acquired by the regression analysis, the explanatory variable in the regression analysis executed upon deriving the evaluation formula is restricted to part of the plurality of parameters. In regression analyses other than the initial regression analysis, part of the plurality of parameters restricted by the previous regression analysis is used to execute the regression analyses.

Based on at least one of the t value and the p value of the explanatory variable acquired by the regression analysis, the explanatory variable in the regression analysis executed upon deriving the evaluation formula is further restricted to part of the plurality of parameters. The evaluation formula deriving unit provided with the restriction unit configured as above can derive a further appropriate evaluation formula.

In the above-described prediction apparatus, the first deriving unit can be configured to derive average response time of the type of transaction processing as an actual value related to the response performance per type of transaction processing. Also, the prediction unit can be configured to calculate a prediction value of average response time of the transaction processing based on the evaluation formula as an evaluation value related to response performance of the new type of transaction processing.

With this method of evaluating response performance of transaction processing, however, it is difficult to make evaluation in consideration of influence on the base environment, although the method is effective in performance evaluation per transaction unit.

It is thus preferable that the first deriving unit is configured, per type of transaction processing, to derive a sum of response time of the type of transaction processing in a predetermined period (i.e., value obtained by multiplying the average response time by execution frequency of transaction processing in the predetermined period of time) as an actual value related to the response performance. It is further preferable that the prediction unit is configured, based on the evaluation formula, to calculate a prediction value of the sum of the response time of the transaction processing in the predetermined period, as an evaluation value related to response performance of the new type of transaction processing. Evaluation of response performance as above can include influence on the base environment.

Also, the evaluation formula deriving unit may be configured to derive the evaluation formula by selectively using a "set of actual values" per type of transaction processing of which actual value related to response performance is from a lowest rank to a predetermined rank. The "set of actual values" include an actual value related to the response performance derived by the first deriving unit and each actual value of the plurality of parameters derived by the second deriving unit. The evaluation formula derived as such can inhibit response performance of the new type of transaction processing from being evaluated excessively high by the evaluation formula. Specifically, the evaluation formula can be derived which can calculate an appropriate evaluation value upon determining whether or not the response performance is favorable.

If the evaluation formula deriving unit has a restriction unit, the restriction unit may be configured to selectively use the "set of actual values" per type of transaction processing of which actual value related to response performance is from a lowest rank to a predetermined rank. Thereby, the restriction unit may restrict the explanatory variable in a regression analysis executed upon deriving the evaluation formula to part of the plurality of parameters.

Or, the restriction unit may be configured to use a "set of actual values" per type of transaction processing, regardless of the rank of the actual value. Thereby, the explanatory variable in a regression analysis executed upon deriving the evaluation formula may be restricted to part of the plurality of parameters.

It is preferable that the prediction apparatus is configured to include a determination output unit. The determination output unit may compare the evaluation value related to response performance of the new type of transaction processing calculated by the prediction unit with a predetermined reference value, determine whether or not to install the new program on the information processing system, and output to a user a result of the determination. According to the prediction apparatus including the above determination output unit, the user can be easily notified of whether or not the new program is favorable.

Further particularly, it is preferable that the determination output unit may be configured to use as the reference value the actual value related to the response performance of the type of transaction processing of which actual value related to the response performance ranks lowest, to determine whether or not to install the new program on the information processing system.

If response performance of the new type of transaction processing is higher than the response performance of transaction processing having the worst response performance, installation of the new program on the information processing system satisfies necessary conditions as response performance of the overall information processing system, since transaction processing which has better response performance than the accepted response performance of the existing transaction processing is executed based on the new program.

If whether or not the new program is favorable is determined as above, the appropriate result of the determination can be outputted to the user. The user can simply grasp whether or not the new program is favorable.

A group of transaction processing can be classified into a plurality of systems of transaction processing which are different in a manner to access the database system. Thus, if there are a large number of samples, response performance of the new type of transaction processing can be precisely evaluated by performing a regression analysis per system of transaction processing and deriving the evaluation formula per system, rather than by performing a regression analysis of the plurality of systems in a lump and deriving the single evaluation formula.

The evaluation formula deriving unit can be configured to derive the evaluation formula per system as follow. Specifically, the evaluation formula deriving unit may derive the evaluation formula by selectively using the "set of actual values" (an actual value related to the response performance and each actual value of the plurality of parameters) per type of transaction processing belonging to the system, per system of transaction processing executed by an existing program.

The new program information acquisition unit can be configured to acquire information indicating a system of the new type of transaction processing, in addition to a value of each the parameter corresponding to the input variable of the evaluation formula. The prediction unit can be configured to calculate an evaluation value related to response performance of the new type of transaction processing, based on the information acquired by the new program information acquisition unit. The evaluation value is calculated using a formula of the same system as the system of the new type of transaction processing. Specifically, the prediction unit inputs the value of each the parameter acquired by the new program information acquisition unit to the evaluation formula to calculate the evaluation value.

According to the prediction apparatus configured as above, the evaluation value related to response performance of the new type of transaction processing is calculated according to the evaluation formula derived from execution history of the same system of transaction processing as the system of the new type of transaction processing. Thus, response performance can be evaluated at high precision.

If the evaluation formula deriving unit includes a restriction unit, the restriction unit may be configured to restrict the explanatory variable in a regression analysis executed upon deriving the evaluation formula of the system to part of the plurality of parameters, per system, by selectively using a "set of actual values" per type of transaction processing belonging to the system.

Or, restriction unit may be configured to use a "set of actual values" per type of transaction processing, regardless of the system, thereby to restrict the explanatory variable in a regression analysis executed upon deriving an evaluation formula of each system to part of the plurality of parameters. Specifically, in the regression analysis executed upon deriving the evaluation formula of each system, the parameter that is common independently of the system may be employed as the explanatory variable.

Also, the evaluation formula deriving unit may be configured to derive an evaluation formula corresponding to a system by selectively using as samples a "set of actual values" per type of transaction processing of which actual value related to response performance is from a lowest rank to a predetermined rank in the transaction processing group belonging to the system, per system. The restriction unit can be configured to restrict the explanatory variable to part of the plurality of parameters, per system, based on the same samples.

The evaluation formula derived as such can inhibit response performance of the new type of transaction processing from being evaluated excessively high by the evaluation formula, as noted above.

Also, the prediction apparatus may be configured to include a determination output unit. The determination output unit compares the evaluation value related to response performance of the new type of transaction processing calculated by the prediction unit with a reference value to determine whether or not to install the new program on the information processing system, and outputs to a user a result of the determination. The reference value is the actual value related to response performance of the type of transaction processing of which actual value related to the response performance ranks lowest in the transaction processing group belonging to the same system as the system of the new type of transaction processing.

As noted above, if response performance of the new type of transaction processing is higher than the response performance of transaction processing having the worst response performance in the existing transaction processing group belonging to the same system as the system of the new type of transaction processing, installation of the new program on the information processing system means to execute transaction processing which has better response performance than the accepted response performance of the existing transaction processing of the same system.

Thus, if the determination on whether or not the new program is favorable is outputted as above, the result of the determination can be switched depending on the response performance of the existing transaction processing of the same system, and notified to the user. The user can easily grasp whether or not the new program is favorable.

It is preferable that the first and second deriving units are configured to derive the "set of actual values" (an actual value related to response performance and each actual value of the plurality of parameters related to operation that affects response speed) by selectively using execution history of the successful transaction processing out of the execution history acquired by the history acquisition unit. If the "set of actual values" are calculated without using execution history of failed transaction processing, response performance of the new type of transaction processing can be properly predicted with the "set of actual values".

The second deriving unit can be configured to compare a statement for the database system described in the execution history with a list of names of tables included in the database system to detect a description of the table name in the statement. The second deriving unit, based on a result of the detection, may derive an actual value related to operation requiring access to the table of the database system, as an actual value related to at least one of the plurality of parameters.

If the description of the table name in the statement in the execution history is detected based on such list of names, the description of the table name can be detected without analyzing the structure of the statement in details.

Detection of the description also facilitates identification of the statement structure around the description. Accordingly, the above-described actual value can be derived with less calculation.

The second deriving unit can be configured to derive a statistic related to a number of inner join tables or outer join tables by transaction processing, as an actual value related to operation requiring access to the table of the database system.

In this case, the second deriving unit can be configured to compare the statement for the database system described in the execution history with the list of table names to detect a description of the table name in the statement, and specify processing details for the table from statement structure around the detected description, thereby to count the number of inner join tables or outer join tables.

A prediction apparatus in the second aspect of the present invention can include a new program acquisition unit and a prediction unit. The prediction apparatus predicts response performance of a new type of transaction processing by using a predetermined evaluation formula.

The predetermined evaluation formula corresponds to an evaluation formula derived by an evaluation formula deriving unit, if the prediction apparatus is provided with the evaluation formula deriving unit. In a case where a designer derives an evaluation formula using other device, the predetermined evaluation formula corresponds to an evaluation formula derived using the other device and set to the present prediction apparatus by the designer.

The evaluation formula can use at least the following two parameters as the plurality of parameters. Specifically, the two parameters are "the number of commands issued to the database system per execution of transaction processing" and "the execution frequency of transaction processing". These parameters are highly relevant to response performance. Evaluation using these parameters allows highly accurate prediction of response performance.

Although the invention of the prediction apparatus has been described in the above, the function as each unit of the prediction apparatus can be implemented by a computer through a program. This program can be stored in a computer-readable recording medium and provided to the user.

The above-described invention can be applied to an invention of a prediction method. The invention of a prediction method can include steps corresponding to each unit provided in the prediction apparatus.

BRIEF DESCRIPTION OF THE DRAWINGS

The present invention will now be described by way of examples with reference to the accompanying drawings, in which:

FIGS. 4A, 4B and 4C are flowcharts illustrating a prediction process executed by a CPU of the prediction apparatus;

FIG. 5 is a flowchart illustrating a log analysis process executed by the CPU of the prediction apparatus according to a second embodiment;

FIG. 7 is a flowchart illustrating a prediction process executed by the CPU of the prediction apparatus according to the second embodiment;

FIG. 8 is a diagram showing particular examples of actual values of various types of transaction processing stored by the prediction apparatus according to a third embodiment;

FIG. 11 is a diagram showing an example of selection of a parameter to be used as an explanatory variable.

DETAILED DESCRIPTION OF THE PREFERRED EMBODIMENTS

First Embodiment

Figure 1:
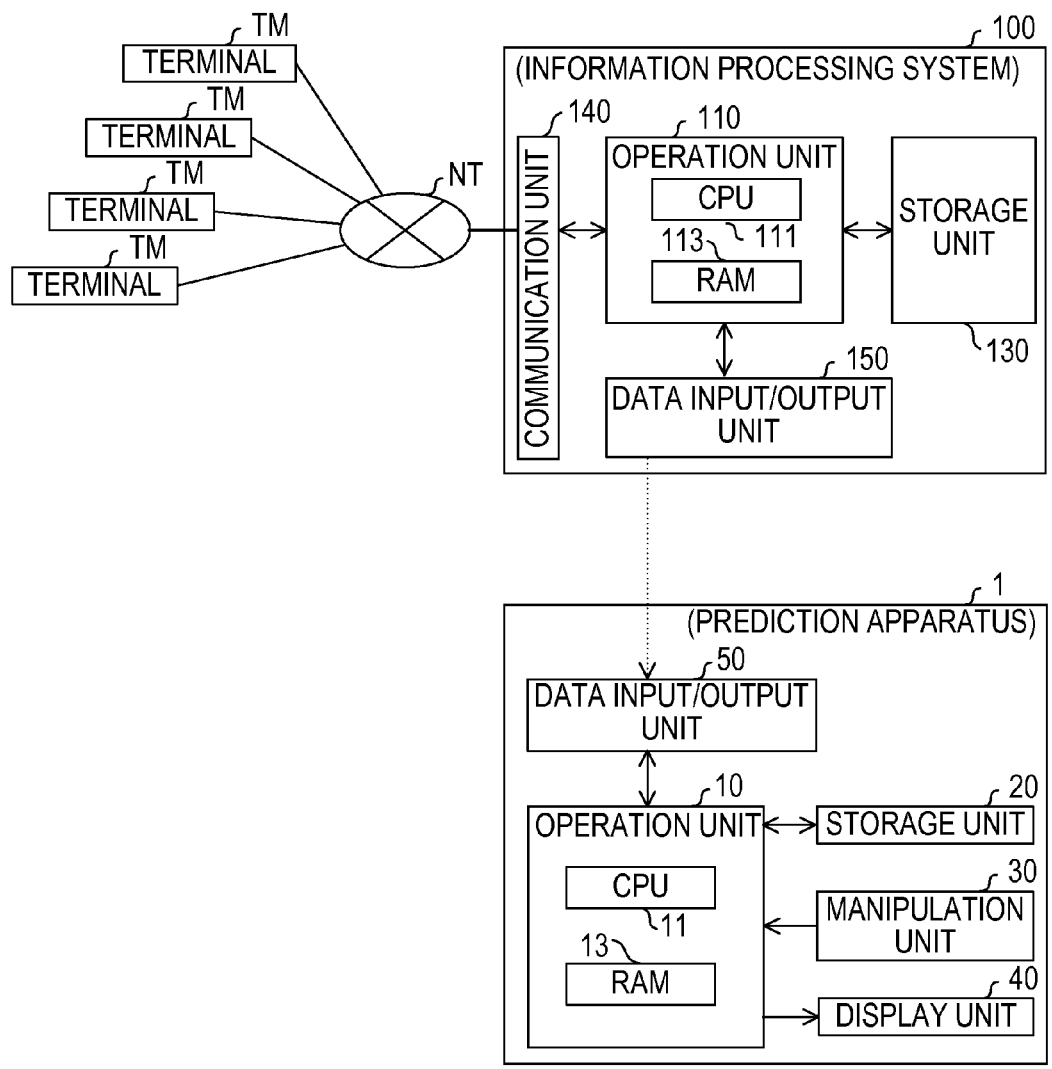
FIG. 1 is a block diagram showing a structure of a prediction apparatus and an information processing system.

A prediction apparatus 1 of the present embodiment shown in FIG. 1 predicts response performance of a new type of transaction processing, when a new program is installed on an information processing system 100 and a CPU 111 of the information processing system 100 executes the new type of transaction processing based on the new program. The information processing system 100 executes transaction processing requiring access to a database system DS (see FIG. 2), in response to an external processing request. Hereinafter, a basic structure of the information processing system 100 will be first described. Thereafter, detailed description of the prediction apparatus 1 will be given.

The information processing system 100 shown in FIG. 1 includes an operation unit 110, a storage unit 130, a communication unit 140, and a data input/output unit 150. The operation unit 110 includes the CPU 111, a RAM 113, and others. The storage unit 130 includes, for example, a hard disk device. The storage unit 130 stores various programs executed by the CPU 111, data necessary for execution of the programs, log files showing execution history of transaction processing executed by the CPU 111, and others. The communication unit 140 can communicate with a terminal TM through a network NT. The data input/output unit 150 includes, for example, a serial communication interface which allows data input/output to/from an external apparatus.

The information processing system 100, for example, is configured as an internal system, such as a client management system, a financial management system, a sales support system and others, which can be accessed online from the terminal TM disposed in a branch office or other location through the internal network NT.

Figure 2:
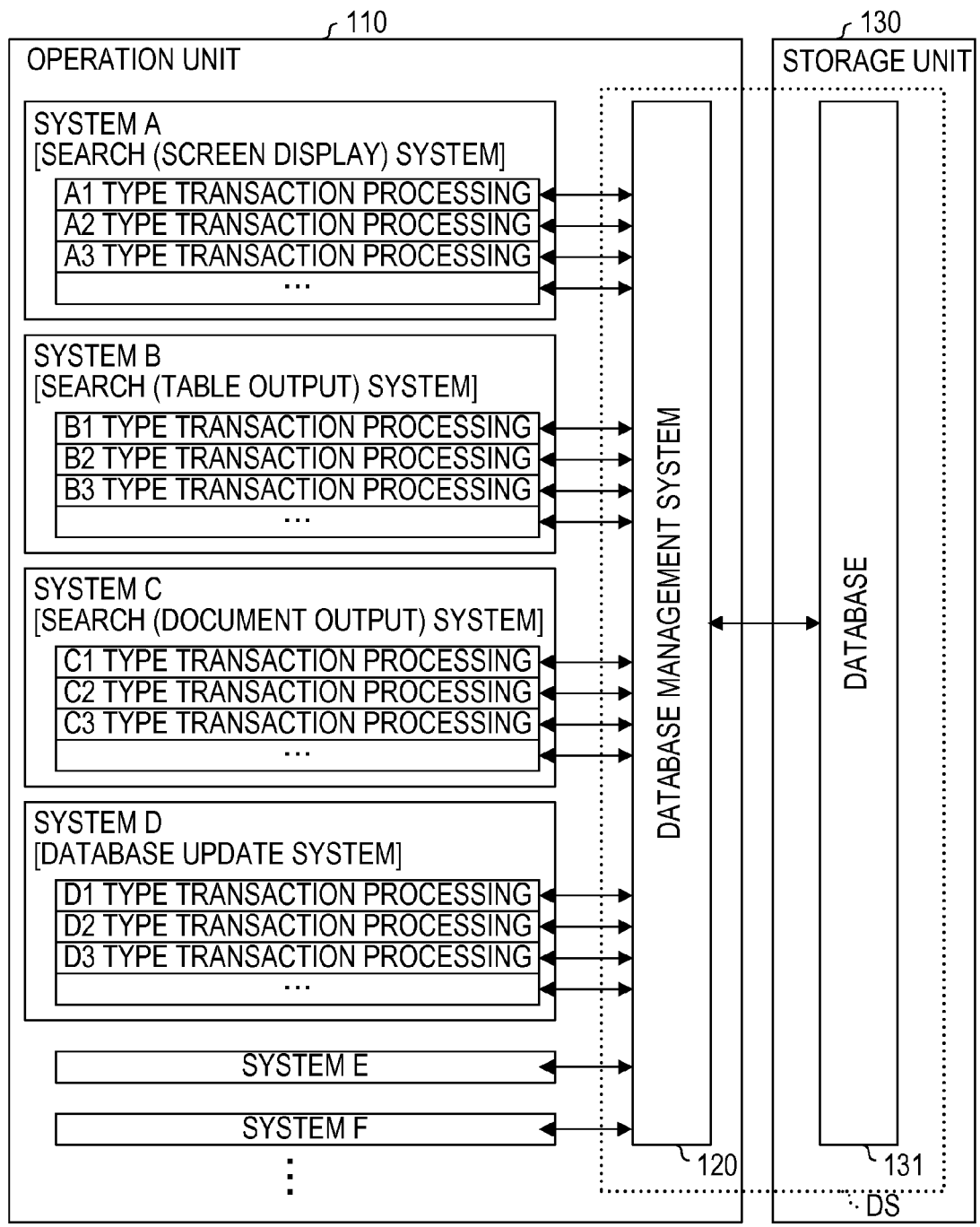
FIG. 2 is a block diagram showing functions implemented in the information processing system.

The information processing system 100, as shown in FIG. 2, is provided with the database system DS including a database 131 and a database management system 120. The database 131 is provided in the storage unit 130. The database management system 120 is implemented by software via the CPU 111. The database management system 120 manages/operates the database 131, as is well known in the art. The database management system 120, in response to a received SQL (Structured Query Language) command, executes a process which includes reading/writing from/to the database 131 and corresponds to the SQL command, and then delivers response data corresponding to the SQL command to a command source.

The database management system 120 extracts, for example, data in a requested column of a designated table in the database 131, according to the SQL command, and then delivers the extracted data to a command source. The database management system 120 also creates a new table by combining a plurality of tables. Further, the database management system 120 extracts data in the requested column of the newly created table, and then delivers the extracted data to a command source. The database management system 120 in the present embodiment has the same function as a known database management system. For example, the database management system 120 can use indexes to refer to the tables in the database 131.

The information processing system 100 executes processes based on the programs preinstalled on the storage unit 130 in the operation unit 110 (CPU 111 in detail). Thereby, the information processing system 100 executes transaction processing corresponding to a processing request provided from the terminal TM through the communication unit 140. In the operation unit 110, a plurality of types of transaction processing are executed based on the programs installed on the storage unit 130.

In each type of transaction processing, processes according to the description of the corresponding program are sequentially executed, SQL commands are issued to the database system DS as required, and a process based on the response data from the database system DS is executed. The detail of the issued SQL commands is changed, depending on the detail of the processing request from the terminal TM.

In each type of transaction processing, SQL commands corresponding to the processing request from the terminal TM are issued as above. A process corresponding to the processing request is executed. The response data corresponding to the requested process is transmitted to the terminal TM as the processing request source. Each type of transaction processing executed in the operation unit 110 of the present embodiment requires access to the database system DS. Thus, the response performance depends on response performance of the database system DS. In the prediction apparatus 1 of the present embodiment, response performance of the transaction processing based on a new program is predicted as later described, in consideration of the above point.

All of the transaction processing use indexes to refer to the database 131. This is because coexistence of both the transaction processing including an SQL command which refers to tables using indexes and the transaction processing including an SQL command which refers to tables without using indexes produces a large difference in response performance of both the transaction processing. Prediction accuracy of response performance by the predication apparatus 1 can be influenced. If such influence on the prediction accuracy can be approved, the aforementioned both transaction processing may coexist.

According to each type of transaction processing executed in the information processing system 100, a record showing execution detail of the transaction processing is stored, per execution of the transaction processing, in a corresponding type of log file among the log files provided per type of transaction processing.

Figure 3:
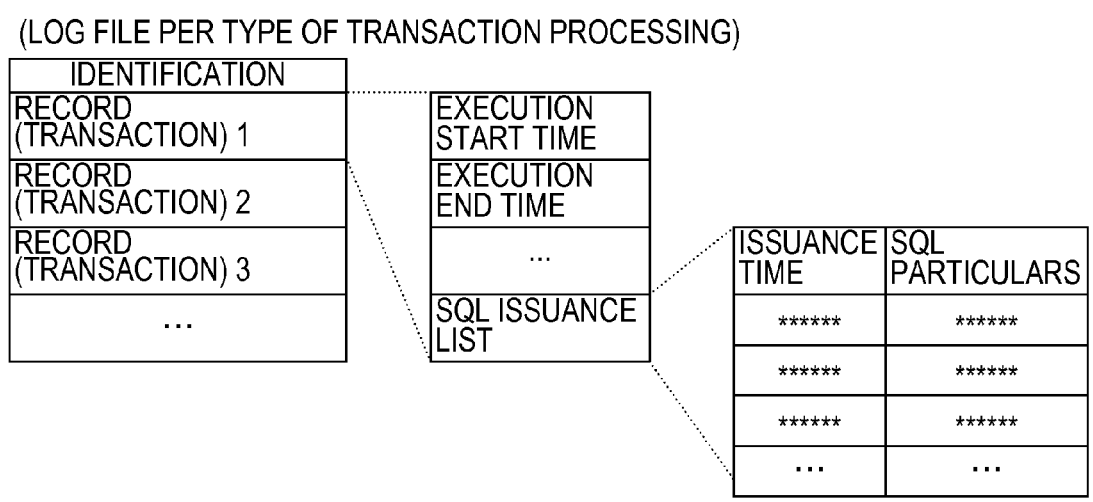
FIG. 3 is a diagram showing a log file structure.

In each of the log files provided per type of transaction processing, an identification code of the transaction processing corresponding to the log file is described, as shown in FIG. 3. An individual identification code is allocated to each type of transaction processing executed in the operation unit 110. The identification code is embedded to a program, for example, when the program corresponding to the transaction processing is created. Specifically, in each type of transaction processing, the log file corresponding to the type of its own is specified based on the identification code. Then, the record per execution of the transaction processing is stored in the specified log file.

Each of the records stored per execution of the transaction processing includes information on execution start time and end time of the transaction processing, and a SQL issuance list. The SQL issuance list includes issuance time per SQL command issued in the course of execution of the transaction processing executed from the execution start time until the execution end time, and the details of the SQL commands (including information on the response data amount corresponding to the SQL commands).

In the information processing system 100 shown in FIG. 1, the record showing execution history of the transaction processing as above is stored in the log file, per execution of the transaction processing.

Next, the detailed structure of the prediction apparatus 1 will be described. The prediction apparatus 1 of the present embodiment, as shown in FIG. 1, includes an operation unit 10, a storage unit 20, a manipulation unit 30, a display unit 40 and a data input/output unit 50, just like a known personal computer. The operation unit 10 is provided with a CPU 11, a RAM 13 and others. The storage unit 20 includes a hard disk device and others. The manipulation unit 20 includes a keyboard, a pointing device, and so on. The display unit 40 includes a liquid crystal display or others. The data input/output unit 50 includes, for example, a serial communication interface through which data can be inputted/outputted to/from an external apparatus.

The operation unit 10 uses the RAM 13 as a work area and executes, in the CPU 11, a process that complies with a program stored in the storage unit 20. With this processing operation, response performance of a new type of transaction processing implemented by a new program installed on the information processing system 100, for example, is predicted. The result of the prediction is outputted to a user through the display unit 40.

Figure 4B:
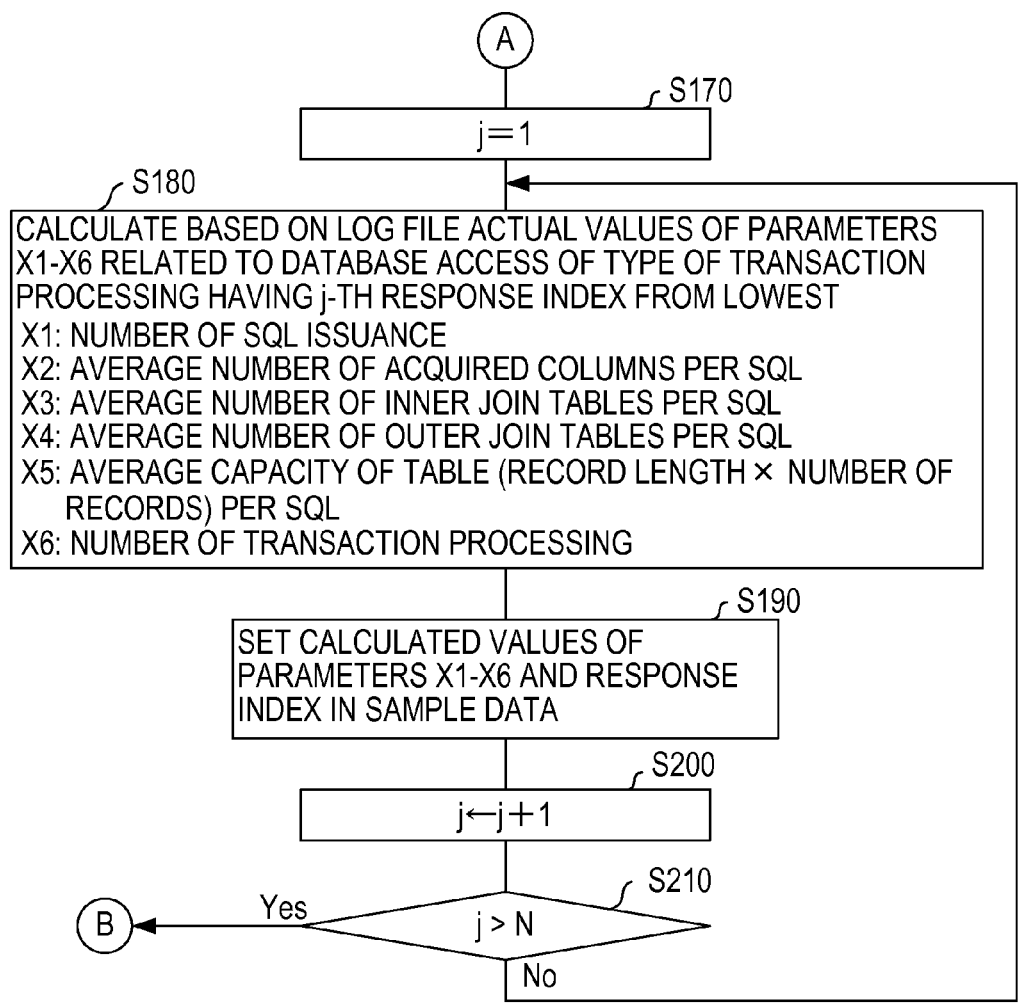
Figure 4C:
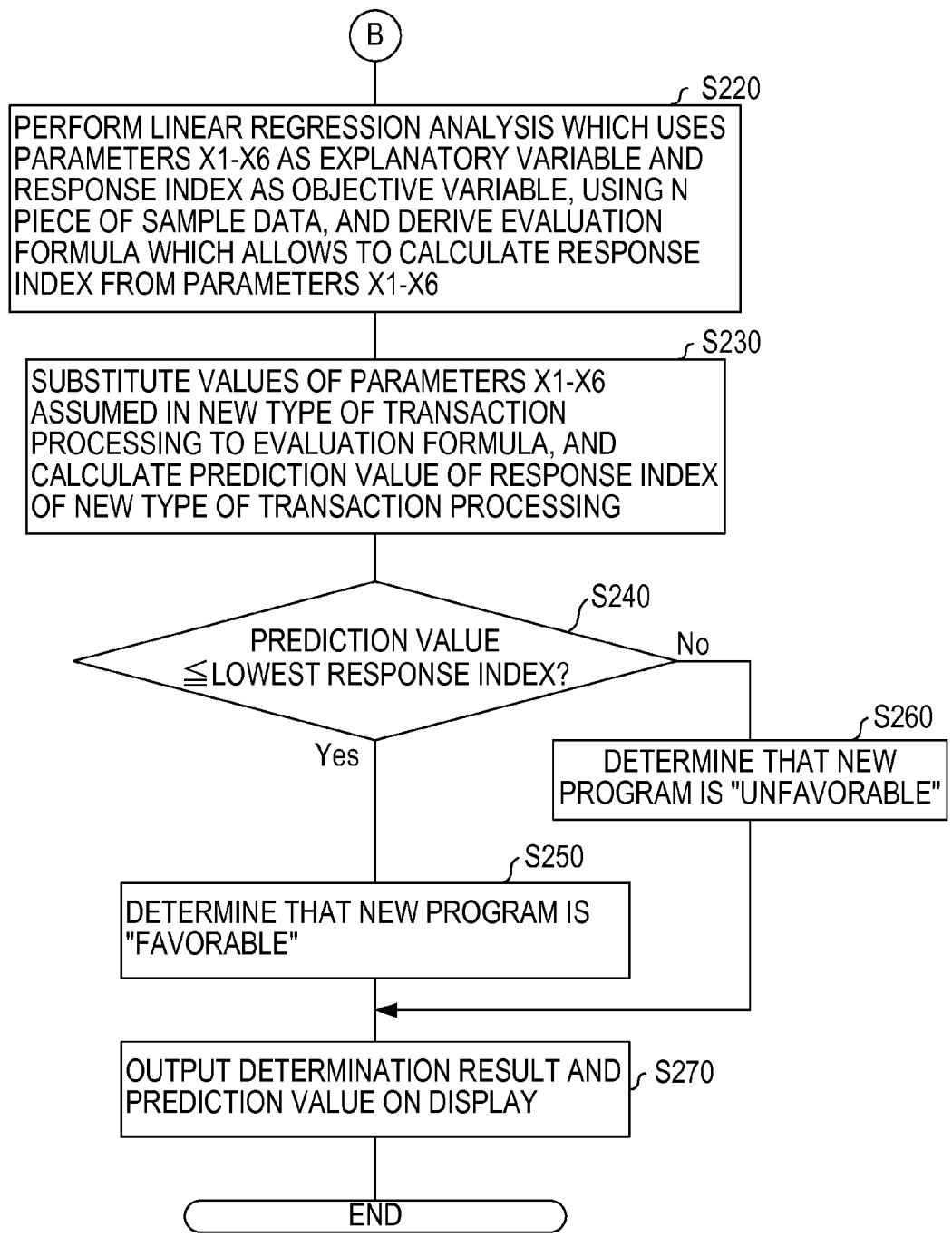

Particularly, the storage unit 130 stores a performance evaluation program for making the CPU 11 execute the process. When an execution command for the performance evaluation program is inputted by a user via the manipulation unit 30, the CPU 11 performs a prediction process of response performance that complies with the performance evaluation program. FIGS. 4A, 4B and 4C show flowcharts of the prediction process executed by the CPU 11.

When the prediction process is started, the CPU 11 first instructs the user via the display unit 40 to input a system identification code corresponding to the new type of transaction processing of which response performance is to be predicted, and then acquires information of the system identification code inputted by the user via the manipulation unit 30 (S110). In the present embodiment, upon predicting response performance of the new type of transaction processing, execution history of the transaction processing executed on the information processing system 100 is used. The response performance of the new type of transaction processing is predicted using especially the execution history of transaction processing of which system of processing details are the same, among all the execution history of the transaction processing executed on the information processing system 100.

Specifically in S110, the user is instructed to input the system identification code in order to perform prediction operation of the response performance, using the execution history of existing transaction processing of which system of processing details are the same as the new type of transaction processing of which response performance is to be predicted. Thereby, which system of a plurality of predetermined systems the new type of transaction processing is classified to is notified by the user. In this manner, in the present embodiment, information on system corresponding to the new type of transaction processing is acquired from the user via the manipulation unit 30.

The CPU 11, after S110, acquires information on each value of a plurality of parameters X1 to X6 related to an amount (such as frequency and data volume) of access to the database system DS assumed in the new type of transaction processing, as parameters related to operation that affects response speed of the database system DS. For example, by instructing the user to input the information via the display unit 40, the information is acquired from the user via the manipulation unit 30.

Particularly, the following information is acquired from the user via the manipulation unit 30: the number of issuance of SQL commands per execution of transaction processing assumed in the new type of transaction process, as the parameter X1; an average number of acquired columns per issuance of SQL commands assumed in the new type of transaction processing, as the parameter X2; an average number of inner join tables per issuance of SQL commands assumed in the new type of transaction processing, as the parameter X3; an average number of outer join tables per issuance of SQL commands assumed in the new type of transaction processing, as the parameter X4; average table volume (record length×number of records) of tables referred to per SQL commands assumed in the new type of transaction processing, as the parameter X5; and execution frequency of transaction processing per predetermined period assumed in the new type of transaction processing, as the parameter X6.

A common population is used for the "average" in the parameters X2 to X5. For example, the average number of acquired columns corresponding to the parameter X2 is not limited to SQL commands including operation of acquiring a column but is an average obtained by division by a total number of SQL commands issued. Similarly, the average number of inner join tables corresponding to the parameter X3 is not limited to SQL commands including inner joining but is an average obtained by division by a total number of SQL commands issued.

When the information on each value of the plurality of parameters X1 to X6 is acquired as above, the CPU 11, in subsequent S130, acquires a log file of each type of transaction processing belonging to the same system as the system of the new type of transaction processing from the information processing system 100 via the data input/output unit 50. The system of the new type of transaction processing is indicated by the system identification code acquired in S110. Which system each type of transaction processing based on the existing program installed on the information processing system 100 belongs to is described in a not shown system table stored in the storage unit 20.

In the system table, various types of transaction processing based on the existing program installed on the information processing system 100 are classified per system. In the system table, a system identification code corresponding to a system to which each type of transaction processing belongs is described in association with the identification code of the type of transaction processing. The CPU 11, referring to the system table, acquires the log file of each type of transaction processing which belongs to the same system as the system of the new type of transaction processing from the information processing system 100 via the data input/output unit 50.

In the present embodiment, as shown in FIG. 2, a group of types of transaction processing which displays a search result of the database 131 on the screen is classified into a system A, a group of types of transaction processing which outputs a search result of the database 131 to a table data file (like an excel file) is classified into a system B, a group of types of transaction processing which outputs a search result of the database 131 to a document data file (like a PDF file) is classified into a system C.

The reason for such classification is because data extraction volume from the database 131 tends to increase/decrease, depending on the output form. Specifically, in the screen display, only sufficient and necessary information in accordance with the display capability of a monitor is extracted from the database 131 to be displayed. In the table data output, however, information including details is extracted from the database 131. Based on this tendency, each type of transaction processing is classified by the output form, in the present embodiment. Another reason is that response time varies depending on the output form. Further, in the present embodiment, a group of types of transaction processing which makes update of the database 131 is classified into a system D.

When acquisition of the log files is completed in S130, the process moves to S140. The CPU 11 selects one type of the existing transaction processing belonging to the same system as the system of the new type of transaction processing, as target transaction processing of which response performance result is to be calculated. Thereafter, based on execution history in the past predetermined period (for example, the last day or the last one month from today) out of the execution history indicated by the log file of the selected target transaction processing, a response index RI of the target transaction processing is calculated (S150).

The response index RI herein is a value Tr×M which is acquired by multiplying execution frequency M of the target transaction processing in a past predetermined period by average response time Tr which is an average of response time (time length from execution start time until execution end time of the transaction processing) of each round of the target transaction processing executed in the past predetermined period. In other words, as the response index RI, a total execution time (total response time) of the target transaction processing executed in the past predetermined period is calculated. The response index RI in the present embodiment is used as an actual value of response performance in the past predetermined period of the target transaction processing.

When the response index RI of the target transaction processing is calculated as above, the process moves to S160. The CPU 11 determines whether or not the response index RI has been calculated with respect to all of the existing various types of transaction processing belonging to the same system as the system of the new type of transaction processing. If not (S160: No), the process moves to S140. The type of transaction processing of which response index RI is not yet calculated is newly selected as the target transaction processing. Then, the CPU 11 executes S150 and the subsequent steps.

When calculation of the response index RI with respect to all of the existing various types of transaction processing belonging to the same system as the system of the new type of transaction processing is completed by repetition of the above steps (S160: Yes), the process moves to S170. The CPU 11 sets a variable j=1 (S170) and executes S180 and the subsequent steps.

Particularly, in S180, actual values of the plurality of parameters X1 to X6 for the type of transaction processing having a j-th response index RI from a lowest rank in the existing various types of transaction processing belonging to the same system as the system of the new type of transaction processing, are calculated based on the execution history in the past predetermined period of the type of transaction processing.

Specifically, a number of issuance of SQL commands per execution of transaction processing specified from the execution history in the past predetermined period shown by the log file is calculated as the actual value of the parameter X1. An average number of acquired columns per issuance of SQL commands specified from the execution history in the past predetermined period is calculated as the actual value of the parameter X2. An average number of inner join tables per issuance of SQL commands specified from the execution history in the past predetermined period is calculated as the actual value of the parameter X3.

An average number of outer join tables per issuance of SQL commands specified from the execution history in the past predetermined period is calculated as the actual value of the parameter X4. Average table volume (record length×number of records) of tables referred to per SQL commands specified from the execution history in the past predetermined period is calculated as the actual value of the parameter X5. Execution frequency of transaction processing in the past predetermined period specified from the execution history in the past predetermined period is calculated as the actual value of the parameter X6. The "past predetermined period" herein has the same time length as the "predetermined period" in S120 and S150.

The process, after S180, moves to S190. The CPU 11 sets, in sample data for use in a regression analysis, a set of each actual value of the plurality of parameters X1 to X6 for the type of transaction processing having the j-th response index RI from the lowest rank calculated in S180 and the response index RI.

Thereafter, the CPU 11 increments the variable j by '1' (S200), and determines whether or not the updated variable j exceeds a specified number N (S210). If the updated variable j does not exceed the specified number N, the process moves to S180. The CPU 11 executes the above-described step based on the updated variable j, and sets, in sample data for use in a regression analysis, a set of each actual value of the plurality of parameters X1 to X6 for the type of transaction processing having the j-th response index RI from the lowest rank, and the response index RI. By the repetition of such operation, sample data for each type of transaction processing having the response index RI from the lowest rank to the N-th rank is generated, in the processing loops from S180 to S210.

When the CPU 11 completes S180 and S190 for each type of transaction processing having the response index RI from the lowest rank to the N-th rank, and the variable j exceeds the specified number N (S210: Yes), the process moves to S220. In S220, by a regression analysis using the N pieces of sample data, an evaluation formula f(X1, ..., X6) which can calculate a prediction value of the response index RI and which uses the parameters X1 to X6 as the input variable and the response index RI as the output variable is derived. The prediction value of the response index RI corresponds to an evaluation value related to response performance of the new type of transaction processing.

Specifically, in S220, a linear regression analysis which uses the parameters X1 to X6 as the explanatory variable and the response index RI as the objective variable is performed, based on the N pieces of sample data corresponding to each type of transaction processing having the response index RI from the lowest rank to the N-th rank, among the plurality of types of transaction processing belonging to the same system as the system of the new type of transaction processing.

As is known, in linear regression analysis, coefficients K1, ..., K6 and an intercept K0 of a hyperplane Y=f(X1, ..., X6) which corresponds to distribution of the sample data are calculated by the least squares method.

$$Y=f(X1,\ldots,X6)=K1\cdot X1+K2\cdot X2+K3\cdot X3+K4\cdot X4+K5\cdot X5+K6\cdot X6+K0$$

The function Y=f(X1, ..., X6) which uses the calculated coefficients K1, ..., K6 and the intercept K0 is derived as the evaluation formula f(X1, ..., X6) which allows to calculate a prediction value of the response index RI of the new type of transaction process from the parameters X1 to X6. In order to derive the evaluation formula f(X1, ..., X6) in this method, the piece number N of the sample data has to be set to be equal to or larger than at least a piece number corresponding to the unknowns K0 to K6.

When the linear regression analysis is performed as above and the evaluation formula f(X1, ..., X6) is derived, the process moves to S230. The CPU 11 substitutes each value of the plurality of parameters X1 to X6 corresponding to the new type of transaction processing acquired in S120 to the evaluation formula f(X1, ..., X6). Thereby, a prediction value of the response index RI related to the new type of transaction processing is calculated.

Thereafter, the CPU 11 determines whether or not the prediction value is equal to or smaller than the response index RI of the type of transaction processing of which response index RI calculated in S150 ranks lowest. Thereby, the CPU 11 determines whether or not the response performance of the new type of transaction processing is better than response performance of the type of transaction processing of which response index RI ranks lowest (S240).

If the prediction value is equal to or smaller than the response index RI of the type of transaction processing of which response index RI ranks lowest (S240: Yes), the CPU 11 determines that installation of the new program which implements the new type of transaction processing on the information processing system 100 is "favorable" (S250). The process moves to S270. In S270, a message indicating that there is no problem in installation of the new program on the information processing system 100 is displayed through the display unit 40. The prediction value of the response index RI calculated in S230 is also displayed through the display unit 40. Thereafter, the prediction process is ended.

If the prediction value is larger than the response index RI of the type of transaction processing of which response index RI ranks lowest (S240: No), the CPU 11 determines that installation of the new program which implements the new type of transaction processing on the information processing system 100 is "unfavorable" (S260). The process moves to S270. In S270, a message indicating that installation of the new program on the information processing system 100 requires a review on necessity of the installation, change in processing details, reinforcement of the system, etc. is displayed through the display unit 40. The prediction value of the response index RI calculated in S230 is also displayed through the display unit 40. Thereafter, the prediction process is ended.

The detailed structure of the prediction apparatus 1 of the present embodiment has been described in the above. According to the present embodiment, a linear regression analysis is performed using as samples each actual value of the plurality of parameters X1 to X6 related to operation that affects response speed of the database system DS in the existing types of transaction processing, and an actual value of response performance (response index) of the existing type of transaction processing. As a result, response performance (response index RI) of the new type of transaction processing can be estimated from the parameters X1 to X6.

Accordingly, use of the prediction apparatus 1 makes it possible to evaluate response performance of transaction processing by the new program in consideration of response performance of the database system DS, without making the computer of the information processing system execute the transaction processing by the new program. As compared to the conventional technique where response performance of the transaction processing by the new program can be evaluated only by a performance test after programming, it is easy to cope with a problem in response performance, if any. A tool useful to the manager of the information processing system 100 can be provided.

Specifically, when there is a problem in response performance, it is convenient to use the prediction apparatus 1 of the present embodiment which can evaluate response performance of the transaction processing by the new program before programming, since future measures to be taken can be chosen from many options such as reviewing processing details, suspension of installation of the new program, and reinforcement of the information processing system 100. According to the present embodiment, it is not necessary to install a new program on the information processing system and execute a performance test, in the condition that the response performance of the new program is unknown. Adverse effect on the transaction processing by the existing program due to installation of the new program having a problem in response performance can be avoided.

According to the prediction apparatus 1 of the present embodiment, the prediction value of the response index RI related to the new type of transaction processing is compared with the response index RI of the type of transaction processing having the worst response index RI. Thereby, whether or not the response index RI of the new type of transaction processing is favorable is determined. The determination result is reported to the user. Thus, the user can be notified of whether or not response performance of the new type of transaction processing is favorable, in a user-friendly manner.

According to the prediction apparatus 1 of the present embodiment, each type of transaction processing is classified into a plurality of systems. Per system, the evaluation formula $f(X1, \ldots, X6)$ is calculated on the basis of execution history of the existing transaction processing. Then, based on the evaluation formula $f(X1, \ldots, X6)$ of the system corresponding to the new type of transaction processing, response performance of the new type of transaction processing is predicted. According to the present embodiment, response performance of the new type of transaction processing can be predicted with high accuracy.

Especially according to the present embodiment, execution history of each type of transaction processing having response performance from the worst to a predetermined number (N pieces), in the existing type of transaction processing group belonging to the same system as the system of the new type of transaction processing, is employed. Based on the execution history, the evaluation formula $f(X1, \ldots, X6)$ is calculated. Thus, response performance of the new type of transaction processing can be inhibited from being estimated excessively favorably. Response performance of the new type of transaction processing can be appropriately determined.

Second Embodiment

Next, a second embodiment will be described. FIG. 5 is a flowchart illustrating a log analysis process executed by the CPU 11 of the prediction apparatus 1, together with a configuration diagram of a log file handled by the prediction apparatus 1 of the second embodiment.

The prediction apparatus 1 of the second embodiment, as is the case with the first embodiment, acquires a log file showing execution history of transaction processing from the information processing system 100 through the data input/output unit 50. Based on the log file, the prediction apparatus 1 predicts response performance of the new type of transaction processing. The log file acquired from the information processing system 100 in the present embodiment, as shown in the right side of FIG. 5, has a simple structure in which details of transaction processing are described in chronological order. Based on the log file, it is necessary to specify a description area of execution history of each transaction processing, and analyze SQL commands described as the execution history. Hereinafter, details of a log analysis process executed by the CPU 11 in order to analyze such log file will be described by way of FIG. 5.

The present embodiment assumes both an environment where execution history of each type of transaction processing is separated per type to be outputted as individual log files from the information processing system 100, and an environment where execution history of a plurality of types of transaction processing are collected to be outputted as a common log file from the information processing system 100. By way of FIG. 5, the log analysis process which can be adapted to the both environments will be described. The log analysis process is executed by the CPU 11 periodically or based on a user's execution command.

When the process shown in FIG. 5 is started, the CPU 11 acquires a log file to be analyzed from the information processing system 100 through the data input/output unit 50 (S310). Thereafter, referring to the log file, the CPU 11 detects a start command for transaction processing executed earliest, among the non-analyzed transaction processing (S320). In the log file, per executed transaction processing, a start command of transaction processing and an end command of transaction processing are described together with the identification code (ID) corresponding to the type of transaction processing. Also, in an area sandwiched between the start command and the end command of transaction processing, a group of SQL commands issued in the transaction processing (hereinafter, referred to as SQL statement) are described. Further in the log file, per the transaction processing, information (such as time stamp) which allows specification of response time (execution time) of the transaction processing is described.

The CPU 11, when detecting the start command of transaction processing, specifies the type of transaction processing based on the identification code of the transaction processing, and then extracts a subsequently described SQL statement as the SQL statement executed in the transaction processing (S330). The CPU 11, when detecting the end command of the transaction processing (S340), determines whether or not the transaction processing has ended normally, based on the type of the end command of the transaction processing (S350). For example, if a command "COMMIT" for reflecting an SQL command on the database 131 is described as the end command, the CPU 11 determines that the transaction processing has ended normally. If a command "ROLLBACK" for discarding a SQL command is described as the end command, the CPU 11 determines that the transaction processing has not ended normally (abnormally ended).

If it is determined that the transaction processing has ended normally (S350: Yes), the process moves to S390 after execution of S360 to S380. If it is determined that the transaction processing has not ended normally (S350: No), the process moves to S390 without execution of S360 to S380.

In S360, the CPU 11 executes the following procedures, regarding the normally ended transaction processing as an object to be analyzed. Specifically, the CPU 11 analyzes the SQL statement extracted in S330 and specifies the number of issuance of SQL commands, the number of acquired columns, the number of inner join tables, the number of outer join tables, and the table volume (length of record×number of records) of a referred table in the transaction processing. Further, response time of the transaction processing is specified.

Thereafter, the CPU 11 updates the value of the response index RI retained for this type of transaction processing, based on the above-specified response time of the transaction processing to be analyzed (S370). The response index RI, as is the case with the above embodiment, indicates the total execution time (sum of response time) of the type of transaction processing executed in a predetermined period. Particularly, the above-specified response time can be added to the current value of the response index RI, to update the response index RI.

The prediction apparatus 1 of the present embodiment retains, in the storage unit 20, information on the response index RI and each actual value of the plurality of parameters X1 to X6 acquired from the execution history of this type of transaction processing, per type of transaction processing. In common with the first embodiment, the actual value of the parameter X1 is the number of issuance of SQL commands per execution of transaction processing. The actual value of the parameter X2 is the average number of acquired columns per issuance of SQL commands.

The actual value of the parameter X3 is the average number of inner join tables per issuance of SQL commands. The actual value of the parameter X4 is the average number of outer join tables per issuance of SQL commands. The actual value of the parameter X5 is the average table volume (record length×number of records) of tables referred to per issuance of SQL commands. The actual value of the parameter X6 is the execution frequency of transaction processing. The execution frequency of transaction processing retained as the actual value of the parameter X6 corresponds to the number of samples of transaction processing used for calculation of actual values of the parameters X1 to X5.

The CPU 11, together with updating the response index RI (S370), updates each actual value of the parameters X1 to X6 corresponding to the type of transaction processing to be analyzed (S380), based on the number issuance of SQL commands, the average number of acquired columns, the average number of inner join tables, the average number of outer join tables, and the average table volume (record length×number of records) of a referred table specified in S360. Then, the process moves to S390.

In S390, the CPU 11 determines whether or not analysis until the end of the log file has been ended. If not (S390: No), the process moves to S320. Then, the CPU 11 executes S320 and the subsequent steps. With the repetition, the CPU 11, per transaction processing, extracts execution history from the log file, analyzes the execution history, and updates the response index RI and each actual value of the parameters X1 to X6 of the corresponding type. When analysis until the end of the log file is ended, the log analysis process is ended.

Figure 6A:
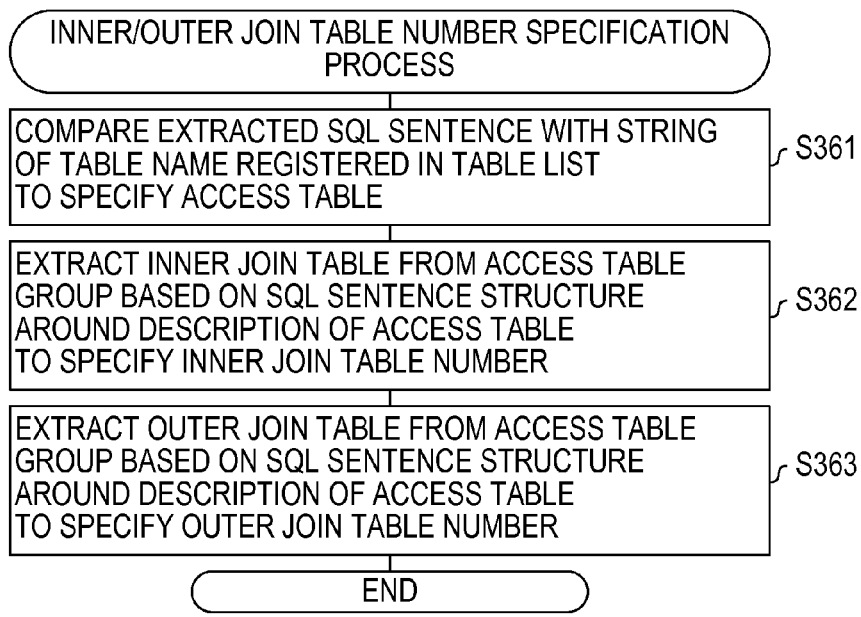
FIG. 6A is a flowchart illustrating an inner/outer join table number specification process executed by the CPU of the prediction apparatus.

In the above-described S360, particularly by executing the process shown in FIG. 6A, the number of inner join tables and the number of outer join tables are specified.

Figure 6B:
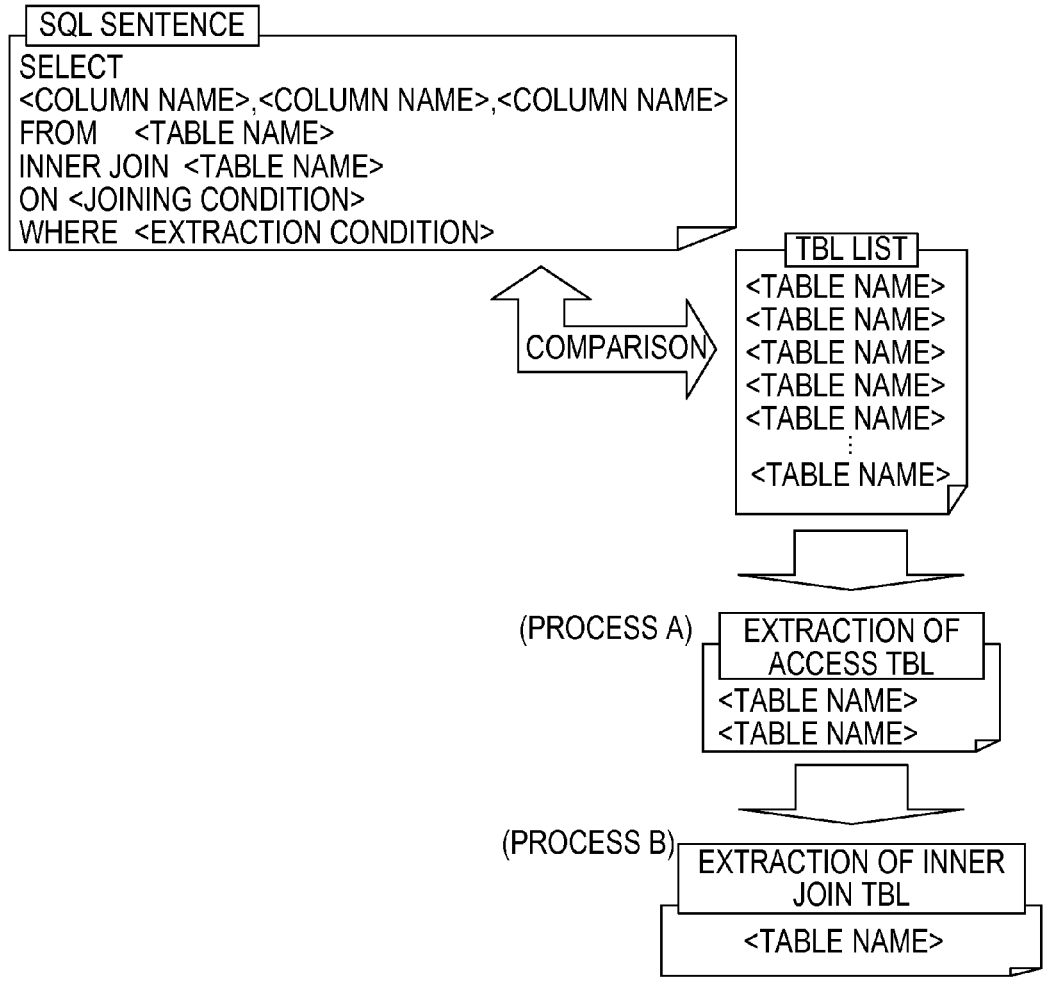
FIG. 6B is an explanatory view of a method of extracting a description related to an inner join table from a SQL statement.

When the inner/outer join table number specification process shown in FIG. 6A is started, the CPU 11 compares the string in the SQL statement extracted in S330 with the name (string) of each table registered in a table list stored in the storage unit 20, to specify a portion in the SQL statement where the table name is described (S361). Thereby, the name of the table referred to by the transaction processing (hereinafter, referred to as access table) is specified. This process corresponds to a "process A" shown in FIG. 6B. In the table list, the name (string) of each table retained in the database system DS is registered. The table list is created by the manager of the information processing system 100 or an information process in the information processing system 100, and stored in the storage unit 20.

When S361 is completed, the process moves to S362. The CPU 11, based on the sentence structure of the SQL statement around the portion where each access table name is described, extracts the access table corresponding to the inner join table out of the access tables specified in S361. By counting the number of the extracted access tables, the number of inner join tables in the transaction processing is specified. This process corresponds to "process B" shown in FIG. 6B. According to FIG. 6B, the table of which name is described immediately before "INNER JOIN" corresponds to the inner join table.

Together with S362, the CPU 11, based on the sentence structure of the SQL statement around the portion where each access table name is described, extracts the access table corresponding to the outer join table out of the access tables specified in S361. By counting the number of the extracted access tables, a process of specifying the number of outer join tables in the transaction processing is executed (S363). Thereafter, the inner/outer join table number specification process is ended. In this manner, the CPU 11 specifies the number of the inner/outer join tables.

Also, the CPU 11 of the present embodiment, by executing a prediction process shown in FIG. 7, based on the result of execution of the above log analysis process executed independently of the prediction process, calculates the prediction value of the response index RI of the new type of transaction processing and outputs the prediction value.

When the prediction process is started, the CPU 11, by executing the steps similar to S110 and S120 in the first embodiment, acquires the system identification code corresponding to the new type of transaction processing (S410).

Further, the CPU 11 acquires information on each value of the parameters X1 to X6 assumed in the new type of transaction processing (S420).

Thereafter, the CPU 11 specifies a total of N types of transaction processing having the response index RI from the lowest rank to the N-th rank, in the type of transaction processing group belonging to the same system as the system of the new type of transaction processing indicated by the system identification code (S430).

Based on each actual value of the parameters X1 to X6 and the response index RI stored in the storage unit 20, sample data per type of transaction processing with respect to the N types of transaction processing is generated (S440). The sample data includes sets of each actual value of the parameters X1 to X6, and the response index RI. As a result, in S440, the same N pieces of sample data as the N pieces of sample data used in S220 in the first embodiment are generated.

Thereafter, the CPU 11 executes the steps similar to S220, S230, S240, S250, S260 and S270 in the first embodiment, as the steps corresponding to S450, S460, S470, S480, S490 and S500.

Thereby, the CPU 11, based on the N pieces of sample data corresponding to the type of transaction processing having the response index RI from the lowest rank to the N-th rank, among the plurality of types of transaction processing belonging to the same system as the system of the new type of transaction processing, performs a linear regression analysis to derive the evaluation formula $f(X1, \ldots, X6)$ that can calculate the prediction value of the response index RI related to the new type of transaction processing and that uses the parameters X1 to X6 as the input variable and the response index RI as the output variable (S450). The CPU 11 then substitutes each value of the plurality of parameters X1 to X6 corresponding to the new type of transaction processing acquired in S420 to the evaluation formula, to calculate the prediction value of the response index RI related to the new type of transaction processing (S460).

Thereafter, based on the value of the response index RI ranking lowest indicated by the sample data group generated in S440, whether or not the prediction value is favorable is determined (S470 to S490). Together with the prediction value of the response index RI, the result of determination is displayed through the display unit 40 (S500). The prediction process is then ended.

Hereinabove, the second embodiment has been described. According to the present embodiment, the log file is analyzed by information processing by the CPU 11, so that actual values of the response index RI and the parameters X1 to X6 are calculated. Thus, as compared to a case of analyzing the log file and calculating the actual values of the response index RI and the parameters X1 to X6 manually, more accurate actual values can be acquired. Also, based on a large volume of execution history, the actual values can be calculated. Errors due to variations of samples can be advantageously suppressed.

Especially according to the present embodiment, upon analyzing the SQL statement, the portion describing the table name is detected using the table list. From the sentence structure of the SQL statement around the portion, description related to the inner join tables and the outer join tables is detected. Thus, as compared to a case of analyzing the SQL statement without using the table list, interpretation of the SQL statement is easy. The SQL statement can be efficiently and accurately analyzed to calculate the actual values.

According to the present embodiment, the evaluation formula is acquired by selectively using execution history of normally ended transaction processing, without using execution history of abnormally ended transaction processing. Thus, with the evaluation formula, response performance (response index) of the new type of transaction processing can be appropriately predicted.

Variation of First Embodiment and Second Embodiment

In the above, the first embodiment and the second embodiment have been described. Examples of variations of these embodiments are as follows. For example, while the total response time (execution time) of transaction processing is calculated as the response index RI in the above embodiments, an average response time of transaction processing may be used as the response index RI. The reason why the total response time is calculated as the response index RI in the present embodiment is to conduct performance evaluation of the new program, taking into consideration the influence on the base environment of the information processing system 100. If performance evaluation of new program is simply conducted, there is no problem in employing the average response time of the transaction processing as the response index RI.

In the above embodiments, a regression analysis is performed which uses the parameters X1 to X6 as the explanatory variable. Thereby, the evaluation formula $f(X1, \ldots, X6)$ that allows to calculate the prediction value of the response index RI related to the new type of transaction processing is derived. For simplification, instead of the parameters X1 to X6, a regression analysis may be performed, for example, using the number of tables to be acquired, the average table volume (record length×number of records) of tables referred to by the type of transaction processing, and the execution frequency of transaction processing in a predetermined period, to derive the evaluation formula. The number of tables to be acquired is the number of tables from which the type of transaction processing acquires data.

Also in the above embodiments, information on each value of the parameters X1 to X6 related to the new program is acquired from the user through the manipulation unit 30. The prediction apparatus 1 may include a program for analyzing the new program to calculate each value of the parameters X1 to X6. Specifically, the prediction apparatus 1 may be configured to analyze the new program acquired from the user and calculate each value of the parameters X1 to X6 corresponding to the program.

In the above embodiments, per type of transaction processing, the response index RI and the parameters X1 to X6 are calculated. A regression analysis is performed using these values as samples. The prediction apparatus 1 may be configured to set the sample per transaction processing and not per the type of transaction processing, to perform a regression analysis. Specifically, the prediction apparatus 1 may be configured to create one sample from execution history of processing of one transaction to perform a regression analysis.

Instead of calculating the response index RI and the parameters X1 to X6 per type of transaction processing, response time at the time of execution of the transaction processing is calculated as an actual value of the response index RI, per transaction processing. As an actual value of the parameter X1, the number of issuance of SQL commands at the time of the execution is calculated. As an actual value of the parameter X2, the average number of acquired columns per issuance of SQL commands at the time of the execution is calculated. As an actual value of the parameter X3, the average number of inner join tables per issuance of SQL commands at the time of the execution is calculated. As an actual value of the parameter X4, the average number of outer join tables per issuance of SQL commands at the time of the execution is calculated. As an actual value of the parameter X5, the average table volume (record length×number of records) of tables referred to per issuance of SQL commands at the time of the execution is calculated.

In this case, a regression analysis is performed using the actual value of response index RI and the actual values of parameters X1 to X5 per transaction processing as samples. Thereby, the evaluation formula $f(X1, \ldots, X5)$ that allows to calculate the prediction value of the response index RI related to the new type of transaction processing is derived.

For example, according to the second embodiment, the response index RI (response time) and the actual values of the parameters X1 to X5 per transaction processing is stored in the storage unit 20 in S370 and S380. In the prediction process shown in FIG. 7, the evaluation formula $f(X1, \ldots, X5)$ is derived using the response index RI (response time) and the actual values of the parameters X1 to X5 per transaction processing stored in the storage unit 20 as sample data.

In this case, as is the case with the above embodiments, based on execution history of the transaction processing group of the same system as the system of the new type of transaction processing, a regression analysis may be performed. Or, regardless of the system, a regression analysis may be performed based on execution history of transaction processing of all the systems.

Also, in S360 of the second embodiment, the table volume (record length×number of records) of a referred table can be specified from information on the record length of the table which is described in association with the table name in the table list and the number of records acquired by SQL commands.

Third Embodiment

Next, the third embodiment will be described. The prediction apparatus 1 of the third embodiment is different from the predication apparatus 1 of the second embodiment in that the prediction device 1 of the third embodiment is configured to: store each actual value of parameters Z1 to Z5 to replace the parameters X1 to X6 per type of transaction processing; update each actual value of the parameters Z1 to Z5 by the log file analysis process; and select parameters for use as the explanatory variable in a regression analysis upon deriving the evaluation formula by the prediction process from the parameters Z1 to Z5.

On the other hand, the prediction apparatus 1 of the third embodiment has a common structure to the prediction apparatus 1 of the second embodiment in many other points. Accordingly, in the following, details of the parameters Z1 to Z5 used by the prediction apparatus 1 of the third embodiment, and details of the log analysis process and prediction process executed by the CPU 11 will be selectively described.

In the storage unit 20 of the prediction apparatus 1 of the present embodiment, the response index RI, each actual value of the parameters Z1 to Z5 and the average response time are stored as actual values acquired from execution history of the type of transaction processing in a past predetermined period shown in the log file, per type of transaction processing.

The actual value of the parameter Z1 is a number of SQL commands per execution of transaction processing. The actual value of the parameter Z2 is an average number of acquired columns per issuance of SQL commands. The actual value of the parameter Z3 is an average number of tables referred to per issuance of SQL commands. The actual value of the parameter Z4 is an average table volume (record length×number of records) of tables referred to per issuance of SQL commands. The actual value of the parameter Z5 is execution frequency of transaction processing in a predetermined period (e.g., one day). The execution frequency of transaction processing retained as the actual value of the parameter Z5 coincides with the number of samples of transaction processing used for calculation of the actual values of the parameters Z1 to Z4.

The CPU 11 in the prediction apparatus 1 of the present embodiment, while executing the log analysis process substantially having details shown in FIG. 5, as is the case with the second embodiment, executes the following procedures in S360 to S380. Specifically, in S360, the SQL statement extracted in S330 (SQL statement of transaction processing to be analyzed) is analyzed. Then, the number of issuance of SQL commands, the number of acquired columns, the access table number which is the number of referred tables, and the access table volume which is the table volume (record length×number of records) of the referred tables, in the transaction processing, are specified. Further, response time of the transaction processing is specified.

In S370, based on the above specified response time, the value of the response index RI retained in the storage unit 20 for the type of transaction processing is updated (S370). The response index RI of the present embodiment, as is the case with the above embodiments, indicates the total execution time (sum of response time) of the type of transaction processing executed in the past predetermined period.

In S380, based on the number of issuance of SQL commands, the number of acquired columns, the access table number, and the access table volume specified in S360, each actual value of the parameters Z1 to Z5 corresponding to the type of transaction processing to be analyzed stored in the storage unit 20 is updated. Further, in S380, by dividing the response index RI by the execution frequency of the transaction processing (Z5), the average response time of the type of transaction processing is calculated. The average response time corresponding to the type of transaction processing to be analyzed stored in the storage unit 20 is updated. FIG. 8 shows examples of the average response time, the response index RI, and each actual value of the parameters Z1 to Z5, per type of transaction processing stored in the storage unit 20. These information are stored in association with the identification codes (ID) corresponding to the type of transaction processing.

Next, the prediction process of the present embodiment executed by the CPU 11 will be described by way of FIGS. 9 to 11. The CPU 11 of the present embodiment, as is the case with the second embodiment, when an execution command is inputted by the user through the manipulation unit 30, executes the prediction process shown in FIG. 9. Thereby, the CPU 11, based on the result of execution of the log analysis process, calculates the prediction value of the response index RI of the new type of transaction processing, and outputs the prediction value.

Figure 9:
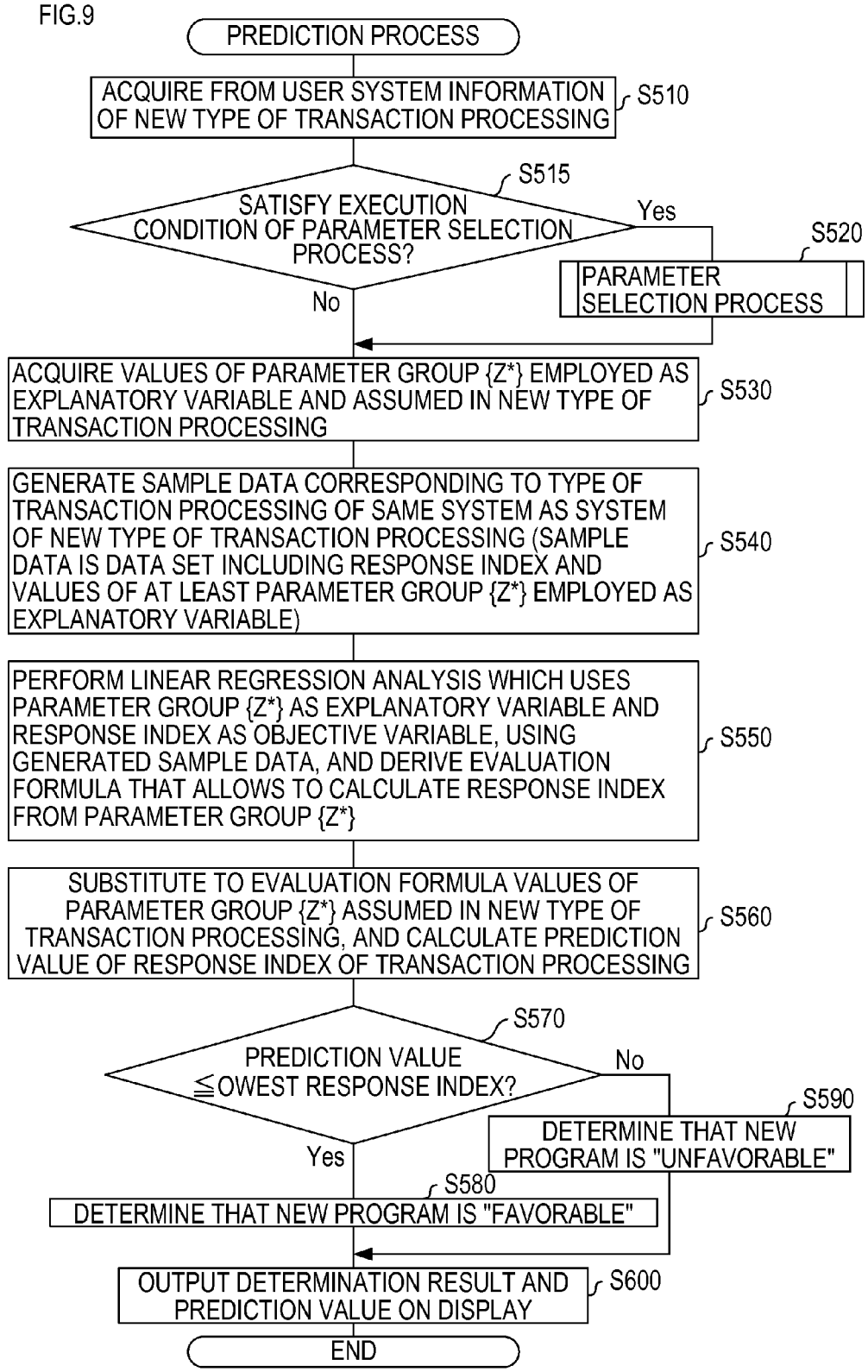
FIG. 9 is a flowchart illustrating a prediction process executed by the CPU of the prediction apparatus according to the third embodiment.
Figure 10:
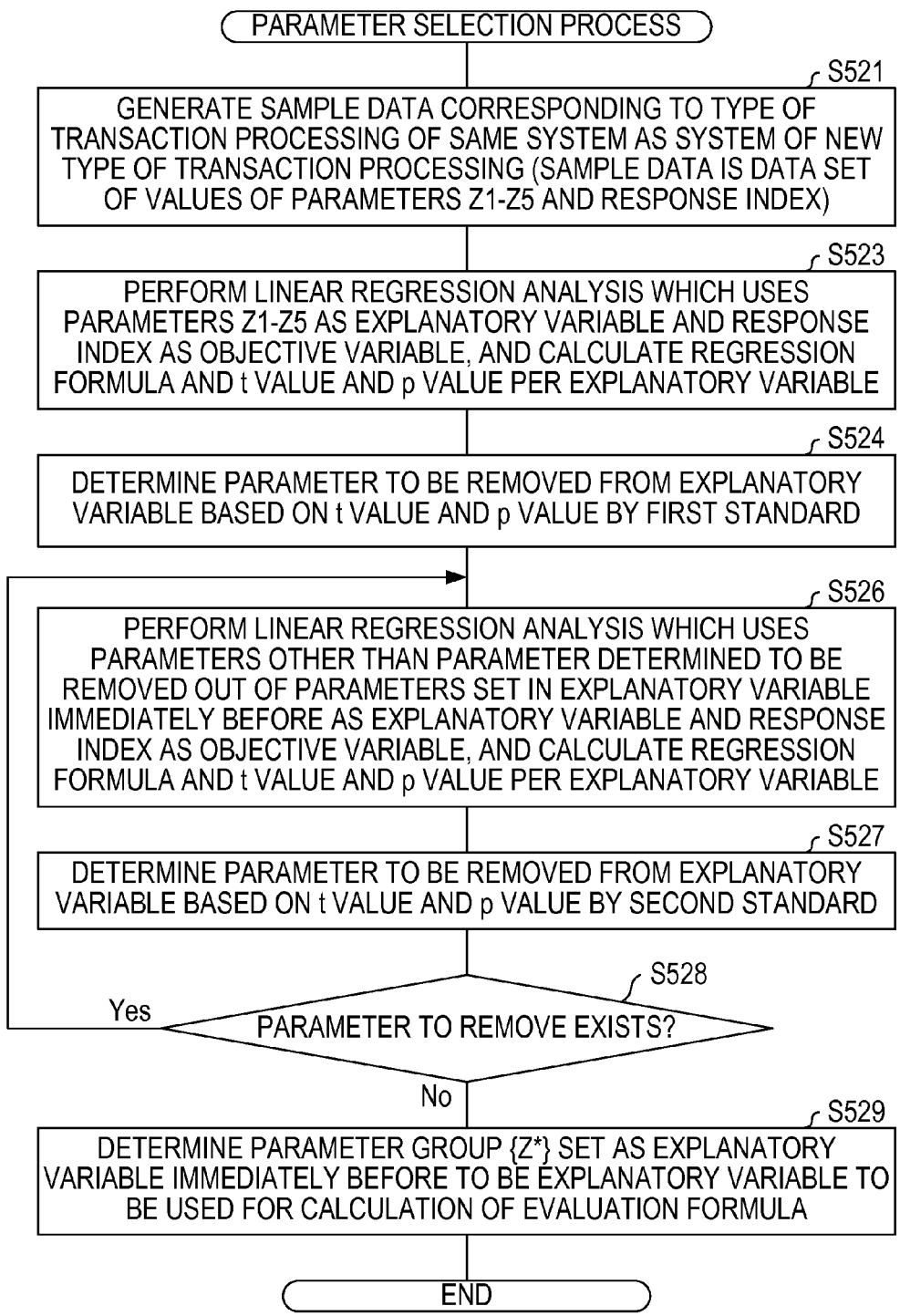
FIG. 10 is a flowchart illustrating a parameter selection process executed by the CPU.

When the prediction process shown in FIG. 9 is started, the CPU 11, by first executing the same step as S410 in the second embodiment, acquires the system identification code corresponding to the new type of transaction processing (S510).

Thereafter, the CPU 11 determines whether or not an execution condition for a parameter selection process is satisfied (S515). In the parameter selection process, of which details will be described later, the parameter used as the explanatory variable in a regression analysis executed for derivation of the evaluation formula (i.e., parameter used as the input variable of the evaluation formula) is selected from the parameters Z1 to Z5. Also in the present embodiment, per system of transaction processing, the parameter selection process is executed.

Thus, in S515, based on the system identification code acquired in S510, it is determined whether or not the parameter selection process is already executed with respect to the system corresponding to the system identification code. If the parameter selection process is not yet executed, it is determined that the execution condition for the parameter selection process is satisfied (S515: Yes). If the parameter selection process is already executed, it is determined that the execution condition for the parameter selection process is not satisfied (S515: No).

The parameter selection process may be executed just one time per system, or per predetermined period. Accordingly, in S515, it may be determined whether or not the parameter selection process related to this system is already executed within the predetermined period. If not, it may be determined that the execution condition for the parameter selection process is satisfied. Otherwise, it may be determined that the execution condition for the parameter selection process is not satisfied. The parameter selection process can be executed every time the prediction process is executed. In this case, it is positively determined in S515 at all times.

If it is determined in S515 that the execution condition for the parameter selection process is satisfied (S515: Yes), the process moves to S520. The CPU 11 executes the parameter selection process shown in FIG. 10. The process moves to S530. If it is determined that the execution condition for the parameter selection process is not satisfied (S515: No), the process moves to S530 without executing 5520.

When the parameter selection process is started, the CPU 11, based on the system identification code acquired in S510, extracts from the storage unit 20 each actual value of the parameters Z1 to Z5 and the response index RI of various types of transaction processing belonging to the same system as the system of the new type of transaction processing, and, based on the extracted data, generates sample data per type of transaction processing (S521). The sample data is composed of the parameters Z1 to Z5 and the response index RI of the type of transaction processing.

In S521, instead of generating the sample data per type as above, the following operation may be executed. Specifically, as is the case with S430 and S440 in the second embodiment, the sample data of a total of N types of transaction processing having the response index RI from the lowest rank to the N-th rank, in the type of transaction processing group of the same system as the system of the new type of transaction processing, may be selectively generated.

After finishing S521, the process moves to S523. The CPU 11 executes a linear regression analysis in which the parameters Z1 to Z5 are set as the explanatory variable, and the response index RI is set as the objective variable, based on the sample data group generated in S521. Thereby, a regression formula, and a t value and a p value per explanatory variable (i.e., per regression coefficient) are calculated (S523).

As is known, the t value acquired in the regression analysis indicates a degree of relevancy of the corresponding explanatory variable to the objective variable. The p value indicates a hazard ratio of the slope of the corresponding explanatory variable. The parameter corresponding to the explanatory variable having a low t value is highly probably inadequate for the explanatory variable. The parameter corresponding to the explanatory variable having a high p value is highly probably inadequate for the explanatory variable.

Accordingly, whether or not the parameter is adequate for the explanatory variable can be determined as follows. Using a known t critical value defined by the relation between a significance level and a degree of freedom, if the t value is smaller than the t critical value, it is determined inadequate. If the t value is equal to or larger than the t critical value, it is determined adequate. If a two-sided test is performed with a degree of freedom of 100 and a significance level of 5%, the t critical value is about 2. Whether or not the parameter is adequate as the explanatory variable can be also determined as follows. If the p value is equal to or smaller than the significance level, it is determined adequate. If the p value exceeds the significance level, it is determined inadequate.

When S523 is ended, the CPU 11 determines the parameter which is highly probably inadequate as the explanatory variable, out of the parameters Z1 to Z5, to be a parameter to be removed from the explanatory variable for use in a regression analysis executed upon derivation of the evaluation formula, based on the t value and p value per explanatory variable acquired in the linear regression analysis (S524).

Particularly, according to a predetermined first standard, a parameter to be removed from the explanatory variable is determined. Specifically, in S524, based on a predetermined significant level α and a degree of freedom defined from the number of sample data and the number of explanatory variable, at critical value upon performing a two-sided test with the significance level α and the degree of freedom is calculated using a known function. Based on the t value and p value per explanatory variable calculated in S523, the parameter corresponding to the explanatory variable of which absolute value of the t value is smaller than the t critical value is provisionally determined to be removed. Also, the parameter corresponding to the explanatory variable of which p value exceeds the predetermined significance level α (exceeds 0.05 if the significance level is 5%) is provisionally determined to be removed.

In the parameter group provisionally determined to be removed, the parameter most adequate as the explanatory variable is excluded from the group. The remaining parameters are formally determined to be removed. Particularly, in the present embodiment, the parameter corresponding to the explanatory variable of which absolute value of the t value is the largest in the parameter group provisionally determined to be removed is excluded from the parameters to be removed. Thereby, the parameters other than the parameter corresponding to the explanatory variable of which absolute value of the t value is the largest, in the parameter group provisionally determined to be removed, is formally determined to be removed. In S524, there may be a case where there is no parameter determined to be removed.

Thereafter, the process moves to S526. The CPU 11 resets the parameters other than the parameter determined to be removed based on the t value and p value acquired from the regression analysis, out of the parameters used for the explanatory variable in the regression analysis immediately before, to the explanatory variable. The CPU 11 executes a linear regression analysis which uses the reset explanatory variable and the response index RI as the objective variable, based on the sample data group generated in S521, to calculate again a regression formula and at value and a p value per explanatory variable (i.e., per regression coefficient).

Thereafter, the CPU 11, based on the t value and p value per explanatory variable acquired in the linear regression analysis, uses a predetermined second standard and determines the parameter which is highly probably inadequate as the explanatory variable, out of the parameters set as the explanatory variable, to be a parameter to be removed from the explanatory variable for use in a regression analysis executed upon derivation of the evaluation formula (S527).

Particularly in S527, based on the same significance level α as in S524 and the degree of freedom defined by the number of sample data and the number of explanatory variable, at critical value corresponding to a two-sided test in the significance level α and the degree of freedom is calculated using a known function. Based on the t value and p value per explanatory variable calculated in S526, the parameter corresponding to the explanatory variable of which absolute value of the t value is smaller than the t critical value is determined to be removed. Also, the parameter corresponding to the explanatory variable of which p value exceeds the predetermined significance level α is determined to be removed. In S527, there may be a case where there is no parameter determined to be removed.

When S527 is ended, the process moves to S528. The CPU 11 determines whether or not there exists a parameter determined to be removed in S527 immediately before. If it is determined that a parameter determined to be removed exists (S528: Yes), the process returns to S526. The above-described step is executed again. Specifically, among the parameters set as the explanatory variable in the regression analysis immediately before (i.e., regression analysis executed in the previous S526), the parameters other than the parameter determined to be removed based on the t value and p value acquired from the regression analysis are reset to the explanatory variable, to execute a linear regression analysis.

Based on the t value and p value obtained from the linear regression analysis, the parameter which is highly probably inadequate as the explanatory variable, out of the parameters set as the explanatory variable, is determined to be removed from the explanatory variable for use in a regression analysis executed upon derivation of the evaluation formula, in the above-described manner (S527). Thereafter, the process moves to S528. The CPU 11 determines whether or not there exists a parameter determined to be removed in S527 immediately before.

If it is determined in S527 immediately before that there exists no parameter determined to be removed (S528: No), the process moves to S529. The parameter group (hereinafter, referred to as "parameter group $\{Z^*\}$") set as the explanatory variable in the regression analysis immediately before is determined to be the explanatory variable for use in derivation of the above evaluation formula of the system corresponding to the system identification code acquired in S510 (evaluation formula for calculating the prediction value of the response index RI in transaction processing of the system). The parameter selection process is ended. In S529, information on the parameters to be used as the explanatory variable upon derivation of the evaluation formula is stored as evaluation formula information in the storage unit 20, in association with the system identification code.

Here, details of the parameter selection process will be described by way of a particular example, referring to FIG. 11. For example, it is assumed that, by the initial regression analysis in the parameter selection process (i.e., S523), the t value and p value per explanatory variable (Z1 to Z5) as shown in the upper part of FIG. 11 are acquired. In this case, if the parameter corresponding to the explanatory variable of which t value is smaller than 2 (or p value exceeds 0.05) is provisionally determined to be removed, the parameters Z2, Z3 and Z4 are provisionally determined to be removed. Then, the parameter Z4 of which absolute value of the t value is the largest is excluded from the parameters to be removed, out of the parameters Z2, Z3 and Z4. The parameters Z2 and Z3 are formally determined to be removed (S524).

In the second regression analysis in the parameter selection process (i.e., S526 at the first time), a regression analysis is performed using the parameters Z1, Z4 and Z5 as the explanatory variable. If the t value and p value per explanatory variable (Z1, Z4 and Z5) as shown in the middle part of FIG. 11 are acquired, it is determined in S527 that the parameter Z4 corresponding to the explanatory variable of which t value is smaller than 2 (or p value exceeds 0.05), out of the parameters Z1, Z4 and Z5 set as the explanatory variable in the regression analysis this time, is determined to be removed.

In the third regression analysis in the parameter selection process (i.e., S526 at the second time), a regression analysis is performed using the parameters Z1 and Z5 as the explanatory variable. If the t value and p value per explanatory variable (Z1 and Z5) as shown in the lower part of FIG. 11 are acquired, it is determined in S527 that there is no parameter determined to be removed. As a result, the parameter group $\{Z^*\}=\{Z1, Z5\}$ is determined to be the parameter to be used as the explanatory variable upon derivation of the evaluation formula (S529).

Next, S530 and the subsequent steps executed by the CPU 11 when the parameter selection process in S520 is completed, or when it is negatively determined in S515, will be described. In S530, the CPU 11 refers to the evaluation formula information that is stored in the storage unit 20 and associated with the system identification code acquired in S510, and specifies the parameter group $\{Z^*\}$ to be used as the explanatory variable upon derivation of the evaluation formula of the system corresponding to the system identification code. Then, among the values of the parameters Z1 to Z5 assumed in the new type of transaction processing of which response performance is to be predicted, information on each value of the above specified parameter group ($Z^*$) is acquired.

Thereafter, the CPU 11, based on the system identification code acquired in S510, extracts from the storage unit 20 each actual value of the parameters Z1 to Z5 and the response index RI of various types of transaction processing of the same system as the system of the new type of transaction processing of which response performance is to be predicted. Using the extracted data, the CPU 11 generates sample data per type of transaction processing (S540). The sample data includes the parameters Z1 to Z5 and the response index RI of the corresponding type of transaction processing.

In S540, instead of generating the above sample data per type, the following operation may be executed. Specifically, as is the case with S430 and S440 in the second embodiment, in the type of transaction processing group of the same system as the system of the new type of transaction processing, the sample data of a total of N types of transaction processing having the response index RI from the lowest rank to the N-th rank may be selectively generated.

After S540 is ended, the process moves to S550. The CPU 11 executes a linear regression analysis in which the parameter group $\{Z^*\}$ is used as the explanatory variable and the response index RI is used as the objective variable, based on the sample data group generated in S540. Thereby, the CPU 11 derives an evaluation formula f($\{Z^*\}$) which uses the parameter group $\{Z^*\}$ as an input variable and the response index RI as an output variable, i.e., the evaluation formula f($\{Z^*\}$) that allows to calculate the prediction value of the response index RI as the evaluation value related to response performance of the new type of transaction processing from the parameter group $\{Z^*\}$. The sample data includes actual values of the parameters which are not used as the explanatory variable. The regression analysis is to be performed without using such values.

After S550 is ended, the CPU 11 substitutes each value of the parameter group $\{Z^*\}$ assumed in the new type of transaction processing acquired in S530 to the derived evaluation formula ft {Z*}), to calculate the prediction value of the response index RI of the new type of transaction processing (S560).

After S560 is ended, the CPU 11 executes the steps similar to S470 to S500 in the second embodiment, in S570 to S600. Specifically, based on the value of the response index RI ranking lowest shown by the sample data group generated in S540, the CPU 11 determines whether or not the above calculated prediction value is favorable (S570 to S590). The result of determination is displayed through the display unit 40, together with the prediction value of the response index RI (S600). Thereafter, the prediction process is ended.

It is described, in the above with respect to all types of transaction processing of the same system as the system of the new type of transaction processing, that the sample data per type may be generated, and the sample data of a total of N types of transaction processing having the response index RI from the lowest rank to the N-th rank, in the type of transaction processing group of the same system as the system of the new type of transaction processing, may be selectively generated.

If the same sample data is generated in S521 and S540 by applying the same manners of generation of sample data to S521 and S540, the regression formula acquired by the regression analysis in S526 last executed in the parameter selection process is consistent with the evaluation value acquired by the regression analysis in S550. Accordingly, in this case, after the parameter selection process is executed in S520, the above regression formula may be used as the evaluation formula to execute S560 and the subsequent steps, without executing S540 to S550.

In the above, the prediction apparatus 1 according to the third embodiment has been described. According to the third embodiment, it is determined in the parameter selection process whether or not use of the parameters Z1 to Z5 as the explanatory variable is adequate. According to the determination result, the explanatory variable for use in derivation of the evaluation formula is limited to part of the parameters Z1 to Z5. Thus, more appropriate evaluation formula can be derived. As a result, the prediction value of the response index RI for the new type of transaction processing can be more appropriately calculated.

As variations of the prediction apparatus 1 according to the third embodiment, the significance level α used in S524 may be set larger than the significance level α used in S527. Also, upon using a different value as the significance level α as such, operation of provisional determination in S524 may be suspended. Specifically, in S524, all the parameters provisionally determined to be removed may be formally determined to be removed. Although the parameter selection process is executed per system in the above embodiment, a parameter selection process common to all the systems may be executed. Specifically, in S521, sample data for each type of transaction processing may be generated regardless of the system.

Also, parameters used for the explanatory variable upon derivation of the evaluation formula may not be set per system, but parameters common to all the systems may be set as the parameters used for the explanatory variable. Further, in the above embodiment, although the parameters to be used as the explanatory variable is selected based on both the t value and p value, the parameters to be used as the explanatory variable may be selected based on one of the t value and p value.

<Correspondence Relation>

Lastly, the correspondence relation between the above embodiments and the present invention will be described. The processing step of S130 or S310 executed by the CPU 11 of the prediction apparatus 1 corresponds to an example of the history acquisition unit. The processing loop of S140 to S160 or the processing steps of S360 and S370 executed by the CPU 11 correspond to an example of the first deriving unit. The processing loop of S170 to S210 or the processing steps of S360 and S380 executed by the CPU 11 correspond to an example of the second deriving unit.

Also, the processing step of S220, S450 or S550 executed by the CPU 11 corresponds to an example of the evaluation formula deriving unit, the processing steps of S110 and S120, S410 and S420, or S510 and S530 correspond to an example of the new program information acquisition unit, the processing step of S230, S460 or S560 corresponds to an example of the prediction unit, and the processing steps of S240 to S270, S470 to S500, or S570 to S600 correspond to an example of the determination output unit.

What is claimed is:

1. A prediction apparatus comprising:
a computer-readable memory having computer-executable instructions stored therein; and
a processor configured to execute the instructions, the instructions arranged in units including:
a history acquisition unit that acquires execution history of transaction processing by an existing program installed on an information processing system, the information processing system executing transaction processing requiring access to a database system in response to an external processing request;
a first deriving unit that, based on the execution history acquired by the history acquisition unit, derives an actual value related to response performance of the transaction processing executed by the existing program, per transaction processing;
a second deriving unit that, based on the execution history acquired by the history acquisition unit, derives each actual value of a plurality of parameters related to operation that affects response speed of the database system in the transaction processing executed by the existing program, per transaction processing;
an evaluation formula deriving unit, based on the actual value related to the response performance per transaction processing derived by the first deriving unit and the each actual value of the plurality of parameters per transaction processing derived by the second deriving unit, derives by regression analysis an evaluation formula that allows to calculate an evaluation value related to response performance of transaction processing to be executed in the information processing system, the evaluation formula using at least part of the plurality of parameters as an input variable and the evaluation value related to response performance of the transaction processing as an output variable;
a new program information acquisition unit that acquires a value of each the parameter corresponding to the input variable of the above evaluation formula, the value being assumed in a new type of transaction processing based on the new program to be installed on the information processing system when the new type of transaction processing is executed by a computer of the information processing system; and
a prediction unit that inputs the value of each the parameter corresponding to the new type of transaction processing acquired by the new program information acquisition unit to the evaluation formula derived by the evaluation formula deriving unit, and calculates an evaluation value related to response performance of the new type of transaction processing, thereby, predicting response performance of the new type of transaction processing.

2. A prediction apparatus comprising:

a computer-readable memory having computer-executable instructions stored therein; and a processor configured to execute the instructions, the instructions arranged in units including:

a history acquisition unit that acquires execution history of a plurality of types of transaction processing by an existing program installed on an information processing system, the information processing system executing transaction processing requiring access to a database system in response to an external processing request;

a first deriving unit that, based on the execution history acquired by the history acquisition unit, derives an actual value related to response performance of the transaction processing executed by the existing program, per type of transaction processing;

a second deriving unit that, based on the execution history acquired by the history acquisition unit, derives each actual value of a plurality of parameters related to operation that affects response speed of the database system in the transaction processing executed by the existing program, per type of transaction processing;

an evaluation formula deriving unit that derives an evaluation formula that, based on the actual value related to the response performance per type of transaction processing derived by the first deriving unit and each actual value of the plurality of parameters per type of transaction processing derived by the second deriving unit, allows to calculate an evaluation value related to response performance of transaction processing to be executed in the information processing system, the evaluation formula using at least part of the plurality of parameters as an input variable and the evaluation value related to response performance of the transaction processing as an output variable;

a new program information acquisition unit that acquires a value of each the parameter corresponding to the input variable of the evaluation formula, the value being also assumed in a new type of transaction processing based on the new program to be installed on the information processing system when the new type of transaction processing is executed by a computer of the information processing system; and a prediction unit that inputs the value of each the parameter corresponding to the new type of transaction processing acquired by the new program information acquisition unit to the evaluation formula derived by the evaluation formula deriving unit, and calculates an evaluation value related to response performance of the new type of transaction processing, thereby, predicting response performance of the new type of transaction processing.

3. The prediction apparatus according to claim 2, wherein the evaluation formula deriving unit derives the evaluation formula by performing a regression analysis, using as samples the actual value related to the response performance per type of transaction processing derived by the first deriving unit and the each actual value of the plurality of parameters per type of transaction processing derived by the second deriving unit.

4. The prediction apparatus according to claim 3, wherein the evaluation formula deriving unit performs, as the regression analysis, a regression analysis which uses the plurality of parameters as an explanatory variable and the evaluation value related to response performance of the transaction processing as an objective variable, thereby deriving, as the evaluation formula, an evaluation formula which uses the plurality of parameters as an input variable and the evaluation value related to response performance of the transaction processing as an output variable.

5. The prediction apparatus according to claim 3, wherein the evaluation formula deriving unit includes a restriction unit, the restriction unit restricts an explanatory variable in the regression analysis executed upon deriving the evaluation formula to part of the plurality of parameters, the restriction unit executes a regression analysis which uses the plurality of parameters as an explanatory variable and the evaluation value related to response performance of the transaction processing as an objective variable, using the samples, and, based on at least one of a t value and a p value of the explanatory variable acquired by the regression analysis, restricts the explanatory variable in the regression analysis executed upon deriving the evaluation formula to part of the plurality of parameters, and the evaluation formula deriving unit derives, as the evaluation formula, an evaluation formula which uses part of the plurality of parameters as the input variable and the evaluation value related to response performance of the transaction processing as the output variable, by performing a regression analysis which uses part of the plurality of parameters restricted by the restriction unit as the explanatory variable and the evaluation value related to response performance of the transaction processing as the objective variable.

6. The prediction apparatus according to claim 5, wherein the restriction unit is configured to gradually restrict the explanatory variable in the regression analysis executed upon deriving the evaluation formula to part of the plurality of parameters, by executing the regression analysis a plurality of times, the restriction unit, in the initial regression analysis out of the plurality of times of regression analyses, uses the plurality of parameters as the explanatory variable to execute the regression analysis, and, based on at least one of a t value and a p value of the explanatory variable acquired by the regression analysis, restricts the explanatory variable in the regression analysis executed upon deriving the evaluation formula to part of the plurality of parameters, the restriction unit, in the regression analyses other than the initial regression analysis, uses part of the plurality of parameters restricted by the previous regression analysis as the explanatory variable to execute the regression analyses, and, based on at least one of the t value and the p value of the explanatory variable acquired by the regression analysis, further restricts the explanatory variable in the regression analysis executed upon deriving the evaluation formula to part of the plurality of parameters.

7. The prediction apparatus according to claim 2, wherein
the first deriving unit derives average response time of the type of transaction processing as the actual value related to the response performance per type of transaction processing, and
the prediction unit calculates a prediction value of average response time of the transaction processing based on the evaluation formula as the evaluation value related to response performance of the new type of transaction processing.

8. The prediction apparatus according to claim 2, wherein
the first deriving unit, per type of transaction processing, derives a sum of response time of the type of transaction processing in a predetermined period as the actual value related to the response performance, and
the prediction unit, based on the evaluation formula, calculates a prediction value of the sum of the response time of the transaction processing in the predetermined period, as the evaluation value related to response performance of the new type of transaction processing.

9. The prediction apparatus according to claim 2, wherein
the evaluation formula deriving unit derives the evaluation formula by selectively using an actual value related to the response performance and each actual value of the plurality of parameters per type of transaction processing of which actual value related to response performance derived by the first deriving unit is from a lowest rank to a predetermined rank.

10. The prediction apparatus according to claim 2, wherein the units of the instructions further comprise:
a determination output unit that compares the evaluation value related to response performance of the new type of transaction processing calculated by the prediction unit with a predetermined reference value, to determine whether or not to install the new program on the information processing system, and outputs to a user a result of the determination.

11. The prediction apparatus according to claim 10, wherein
the reference value is an actual value related to the response performance of the type of transaction processing of which actual value related to the response performance derived by the first deriving unit ranks lowest.

12. The prediction apparatus according to claim 2, wherein
a plurality of types of the transaction processing executed by the existing program are classified into systems,
the evaluation formula deriving unit derives the evaluation formula per system, by selectively using an actual value related to the response performance per type of transaction processing belonging to the system derived by the first deriving unit, and each actual value of the plurality of parameters per type of transaction processing belonging to the system derived by the second deriving unit,
the new program information acquisition unit acquires information indicating a system of the new type of transaction processing, in addition to value of each the parameter corresponding to the new type of transaction processing, and
the prediction unit inputs the value of each the parameter corresponding to the new type of transaction processing to the evaluation formula that is derived by the evaluation formula deriving unit, thereby to calculate an evaluation value related to response performance of the new type of transaction processing, the evaluation formula being of the same system as the system of the new type of transaction processing indicated by the information acquired by the new program information acquisition unit.

13. The prediction apparatus according to claim 12, wherein
the evaluation formula deriving unit derives the evaluation formula per system, by selectively using an actual value related to the response performance and each actual value of the plurality of parameters per type of transaction processing of which actual value related to the response performance is from a lowest rank to a predetermined rank in the transaction processing group belonging to the system.

14. The prediction apparatus according to claim 12, wherein the units of the instructions further comprise:
a determination output unit that compares the evaluation value related to response performance of the new type of transaction processing calculated by the prediction unit with a predetermined reference value, to determine whether or not to install the new program on the information processing system, and outputs to a user a result of the determination, wherein
the reference value is an actual value related to the response performance of the type of transaction processing of which actual value related to the response performance ranks lowest, in the transaction processing group belonging to the same system as the system of the new type of transaction processing.

15. The prediction apparatus according to claim 2, wherein
the first and second deriving units are configured to derive the actual values by selectively using execution history of the successful transaction processing among the execution history acquired by the history acquisition unit.

16. The prediction apparatus according to claim 2, wherein
the second deriving unit is configured to compare a statement for the database system described in the execution history with a list of names of tables included in the database system to detect a description of the table name in the statement, and, based on a result of the detection, derive an actual value related to operation requiring access to the table of the database system as an actual value related to at least one of the plurality of parameters.

17. The prediction apparatus according to claim 16, wherein
the second deriving unit is configured to derive a statistic related to a number of inner join tables or outer join tables in transaction processing, as the actual value related to operation requiring access to the table of the database system,
the second deriving unit compares the statement for the database system described in the execution history with the list of table names to detect a description of the table name in the statement, and specifies processing details for the table corresponding to the description from statement structure around the detected description to count the number of inner join tables or outer join tables, thereby to derive the statistic.

18. A prediction apparatus comprising:
a computer-readable memory having computer-executable instructions stored therein; and
a processor configured to execute the instructions, the instructions arranged in units including:
a prediction unit that predicts response performance of a new type of transaction processing, when a new program is installed on an information processing system and a computer of the information processing system executes the new type of transaction processing based on the new program, the information processing system executing transaction processing requiring access to a database system in response to an external processing request; and a new program acquisition unit that acquires each value of a plurality of parameters related to operation that affects response speed of the database system assumed in the new type of transaction processing, when the computer of the information processing system executes the new type of transaction processing based on the new program, wherein the prediction unit inputs the each value of the plurality of parameters corresponding to the new type of transaction processing acquired by the new program information acquisition unit to a predetermined evaluation formula, the evaluation formula being derived by performing a regression analysis based on an actual value related to response performance per transaction processing executed by an existing program or per type of transaction processing and each actual value of the plurality of parameters per the transaction processing or per the type of transaction processing, and calculates an evaluation value related to response performance of the new type of transaction processing, thereby to predict response performance of the new type of transaction processing.

19. The prediction apparatus according to claim 18, wherein the plurality of parameters correspond to at least two parameters, one of the two parameters is a number of commands issued to the database system per execution of transaction processing, and the other of the two parameters is a execution frequency of transaction processing.

20. A prediction method comprising:

a history acquisition step in which execution history of transaction processing by an existing program installed on an information processing system is acquired, the information processing system executing transaction processing requiring access to a database system in response to an external processing request;

a first deriving step in which, based on the execution history acquired in the history acquisition step, an actual value related to response performance of transaction processing executed by the existing program is derived per transaction processing;

a second deriving step in which, based on the execution history acquired in the history acquisition step, each actual value of a plurality of parameters related to operation that affects response speed of the database system in the transaction processing executed by the existing program is derived per transaction processing;

an evaluation formula deriving step in which, based on the actual value related to the response performance per transaction processing derived in the first deriving step and the each actual value of the plurality of parameters per transaction processing derived in the second deriving step, an evaluation formula is derived by regression analysis, such that the evaluation, formula can calculate an evaluation value related to response performance of transaction processing to be executed in the information processing system, the evaluation formula using at least part of the plurality of parameters as an input variable and the evaluation value related to response performance of the transaction processing as an output variable;

a new program information acquisition step in which a value of each the parameter which corresponds to the input variable of the evaluation formula assumed in the new type of transaction processing when a computer of the information processing system executes the new type of transaction processing based on a new program to be installed on the information processing system, is acquired; and a prediction step in which the value of each the parameter corresponding to the new type of transaction processing acquired in the new program information acquisition step is inputted to the evaluation formula derived in the evaluation formula deriving step, and an evaluation value related to response performance of the new type of transaction processing is calculated, so that response performance of the new type of transaction processing is predicted, wherein response performance of the new type of transaction processing is predicted with these steps, when the new program is installed on the information processing system.

21. A prediction method comprising:

a history acquisition step in which execution history of a plurality of types of transaction processing by an existing program installed on an information processing system is acquired, the information processing system executing transaction processing requiring access to a database system in response to an external processing request;

a first deriving step in which, based on the execution history acquired in the history acquisition step, an actual value related to response performance of the type of transaction processing executed by the existing program is derived per type of transaction processing;

a second deriving step in which, based on the execution history acquired in the history acquisition step, each actual value of a plurality of parameters related to operation that affects response speed of the database system in the type of transaction processing executed by the existing program is acquired per type of transaction processing;

an evaluation formula deriving step in which, based on the actual value related to the response performance per type of transaction processing derived in the first deriving step and the each actual value of the plurality of parameters per type of transaction processing derived in the second deriving step, an evaluation formula is derived which allows to calculate an evaluation value related to response performance of transaction processing to be executed in the information processing system, the evaluation formula using at least part of the plurality of parameters as an input variable and the evaluation value related to response performance of the transaction processing as an output variable;

an new program information acquisition step in which a value of each the parameter is acquired which corresponds to the input variable of the evaluation formula assumed in the new type of transaction processing when a computer of the information processing system executes the new type of transaction processing based on a new program to be installed on the information processing system;

a prediction step in which the value of each the parameter corresponding to the new type of transaction processing acquired in the new program information acquisition step is inputted to the evaluation formula derived in the evaluation formula deriving step, and an evaluation value related to response performance of the new type of transaction processing is calculated, so that response performance of the new type of transaction processing is predicted, wherein response performance of the new type of transaction processing is predicted with these steps, when the new program is installed on the information processing system.

22. A prediction method comprising:

a prediction step in which response performance of a new type of transaction processing is predicted, when a new program is installed on an information processing system and a computer of the information processing system executes the new type of transaction processing based on the new program, the information processing system executing transaction processing requiring access to a database system in response to an external processing request; and a new program information acquisition step in which each value of a plurality of parameters related to operation that affects response speed of the database system assumed in the new type of transaction processing, when the computer of the information processing system executes the new type of transaction processing based on the new program, is acquired, wherein the prediction step is a step in which the each value of the plurality of parameters corresponding to the new type of transaction processing acquired in the new program information acquisition step is inputted to a predetermined evaluation formula, the evaluation formula being derived by performing a regression analysis based on an actual value related to response performance per transaction processing executed by an existing program or per type of transaction processing and each actual value of the plurality of parameters per the transaction processing or per the type of transaction processing, and an evaluation value related to response performance of the new type of transaction processing is calculated, so that response performance of the new type of transaction processing is predicted.

23. A prediction method according to claim 22, wherein the plurality of parameters correspond to at least two parameters, one of the two parameters is a number of commands issued to the database system per execution of transaction processing, and the other of the two parameters is a execution frequency of transaction processing.

24. A computer-readable and non-transitory recording medium that stores a program for making a computer execute a process of predicting response performance of transaction processing, the process of predicting response performance of the transaction processing comprising:

a history acquisition step in which execution history of transaction processing by an existing program installed on an information processing system is acquired, the information processing system executing transaction processing requiring access to a database system in response to an external processing request;

a first deriving step in which, based on the execution history acquired in the history acquisition step, an actual value related to response performance of transaction processing executed by the existing program is derived per transaction processing;

a second deriving step in which, based on the execution history acquired in the history acquisition step, each actual value of a plurality of parameters related to operation that affects response speed of the database system in the transaction processing executed by the existing program is derived per transaction processing;

an evaluation formula deriving step in which, based on the actual value related to the response performance per transaction processing derived in the first deriving step and the each actual value of the plurality of parameters per transaction processing derived in the second deriving step, an evaluation formula is derived by regression analysis, such that the evaluation formula can calculate an evaluation value related to response performance of transaction processing to be executed in the information processing system, the evaluation formula using at least part of the plurality of parameters as an input variable and the evaluation value related to response performance of the transaction processing as an output variable;

a new program information acquisition step in which a value of each the parameter which corresponds to the input variable of the evaluation formula assumed in the new type of transaction processing when a computer of the information processing system executes the new type of transaction processing based on a new program to be installed on the information processing system, is acquired; and a prediction step in which the value of each the parameter corresponding to the new type of transaction processing acquired in the new program information acquisition step is inputted to the evaluation formula derived in the evaluation formula deriving step, and an evaluation value related to response performance of the new type of transaction processing is calculated, so that response performance of the new type of transaction processing is predicted.

25. A computer-readable and non-transitory recording medium that stores a program for making a computer execute a process of predicting response performance of transaction processing, the process of predicting response performance of the transaction processing comprising:

a history acquisition step in which execution history of a plurality of types of transaction processing by an existing program installed on an information processing system is acquired, the information processing system executing transaction processing requiring access to a database system in response to an external processing request;

a first deriving step in which, based on the execution history acquired in the history acquisition step, an actual value related to response performance of the type of transaction processing executed by the existing program is derived per type of transaction processing;

a second deriving step in which, based on the execution history acquired in the history acquisition step, each actual value of a plurality of parameters related to operation that affects response speed of the database system in the type of transaction processing executed by the existing program is acquired per type of transaction processing;

an evaluation formula deriving step in which, based on the actual value related to the response performance per type of transaction processing derived in the first deriving step and the each actual value of the plurality of parameters per type of transaction processing derived in the second deriving step, an evaluation formula is derived which allows to calculate an evaluation value related to response performance of transaction processing to be executed in the information processing system, the evaluation formula using at least part of the plurality of parameters as an input variable and the evaluation value related to response performance of the transaction processing as an output variable;

an new program information acquisition step in which a value of each the parameter is acquired which corresponds to the input variable of the evaluation formula assumed in the new type of transaction processing when a computer of the information processing system executes the new type of transaction processing based on a new program to be installed on the information processing system;

a prediction step in which the value of each the parameter corresponding to the new type of transaction processing acquired in the new program information acquisition step is inputted to the evaluation formula derived in the evaluation formula deriving step, and an evaluation value related to response performance of the new type of transaction processing is calculated, so that response performance of the new type of transaction processing is predicted.

26. A computer-readable and non-transitory recording medium that stores a program for making a computer execute a process of predicting response performance of transaction processing, the process of predicting response performance of the transaction processing being a process of predicting response performance of a new type of transaction processing when a new program is installed on an information processing system and a computer of the information processing system executes the new type of transaction processing based on the new program, the information processing system executing transaction processing requiring access to a database system in response to an external processing request, the process of predicting response performance of the transaction processing comprising:

a new program information acquisition step in which each value of a plurality of parameters related to operation that affects response speed of the database system assumed in the new type of transaction processing, when the computer of the information processing system executes the new type of transaction processing based on the new program, is acquired; and a prediction step in which the each value of the plurality of parameters corresponding to the new type of transaction processing acquired in the new program information acquisition step is inputted to a predetermined evaluation formula, the evaluation formula being derived by performing a regression analysis based on an actual value related to response performance per transaction processing executed by an existing program or per type of transaction processing and each actual value of the plurality of parameters per the transaction processing or per the type of transaction processing, and an evaluation value related to response performance of the new type of transaction processing is calculated, so that response performance of the new type of transaction processing is predicted.

* * * * *